(12) United States Patent
Huh et al.

(10) Patent No.: US 11,845,388 B2
(45) Date of Patent: Dec. 19, 2023

(54) AC ELECTRICAL POWER SYSTEM FOR A VEHICLE

(71) Applicants: General Electric Company, Schenectady, NY (US); General Electric Deutschland Holding GmbH, Frankfurt (DE)

(72) Inventors: Kum Kang Huh, Niskayuna, NY (US); Mohamed Osama, Garching (DE)

(73) Assignees: General Electric Company, Schenectady, NY (US); General Electric Deutschland Holding GmbH, Frankfurt (DE)

(*) Notice: Subject to any disclaimer, the term of this patent is extended or adjusted under 35 U.S.C. 154(b) by 12 days.

(21) Appl. No.: 17/325,404

(22) Filed: May 20, 2021

(65) Prior Publication Data

US 2022/0371532 A1 Nov. 24, 2022

(51) Int. Cl.
*B60R 16/03* (2006.01)
*B60L 50/13* (2019.01)
(Continued)

(52) U.S. Cl.
CPC .......... *B60R 16/0307* (2013.01); *B60L 50/13* (2019.02); *B64D 27/18* (2013.01);
(Continued)

(58) Field of Classification Search
CPC ...... B60R 16/0307; B60L 50/10; B60L 50/13; B60L 2200/10; B64D 27/02; B64D 27/16;
(Continued)

(56) References Cited

U.S. PATENT DOCUMENTS 4,692,671 A 9/1987 Dishner et al.
4,695,776 A 9/1987 Dishner et al.
(Continued)

FOREIGN PATENT DOCUMENTS

CA 29707376 A1 2/2018
EP 2644866 A2 10/2013
(Continued)

OTHER PUBLICATIONS

Fernando et al., Direct Drive Permanent Magnet Generator Fed AC-DC Active Rectification and Control for MEA Engines, IET Electr Power Appl, Special Issue on Electrical Machines & Drives in the MEA, Apr. 26, 2010, pp. 1-5.
(Continued)

*Primary Examiner* — Loren C Edwards
(74) *Attorney, Agent, or Firm* — Dority & Manning, P.A.

(57) ABSTRACT

An AC electrical system for a vehicle and methods of operating the same are provided. In one aspect, an AC electrical system includes a first electric machine mechanically coupled with a first spool of a gas turbine engine and a second electric machine mechanically coupled with a second spool of the gas turbine engine. The system also includes a first AC bus and a second AC bus. A first electrical channel electrically couples the first electric machine to the first AC bus and a second electrical channel electrically couples the second electric machine to the second AC bus. The system also includes one or more connection links and one or more power converters for selectively electrically coupling the first and second electrical channels so that electrical power generated by one electric machine can be converted and shared with the other electric machine and electrical loads of the other channel.

12 Claims, 21 Drawing Sheets

(51) Int. Cl.
*B64D 27/18* (2006.01)
*F01D 15/10* (2006.01)
*F02C 7/275* (2006.01)
*H02J 1/10* (2006.01)
*H02K 11/042* (2016.01)
*H02P 101/30* (2015.01)

(52) U.S. Cl.
CPC .............. *F01D 15/10* (2013.01); *F02C 7/275* (2013.01); *H02J 1/102* (2013.01); *H02K 11/042* (2013.01); *B60L 2200/10* (2013.01); *H02P 2101/30* (2015.01)

(58) Field of Classification Search
CPC ........ B64D 27/18; B64D 27/24; B64D 41/00; F01D 15/10; F02C 7/275; H02J 1/102; H02J 3/06; H02J 3/38; H02J 3/381; H02J 2310/44; H02K 11/042; H02P 2101/30
See application file for complete search history.

(56) References Cited

U.S. PATENT DOCUMENTS

| | | | |
|---|---|---|---|
| 4,967,097 | A | 10/1990 | Mehl |
| 5,153,498 | A | 10/1992 | Parro |
| 5,466,974 | A | 11/1995 | Sutrina et al. |
| 6,023,134 | A | 2/2000 | Carl et al. |
| 6,418,707 | B1 | 7/2002 | Paul |
| 6,992,403 | B1 | 1/2006 | Raad |
| 7,116,003 | B2 | 10/2006 | Hoppe |
| 7,425,807 | B1 | 9/2008 | Perkins et al. |
| 7,513,120 | B2 | 4/2009 | Kupratis |
| 7,635,922 | B2 | 12/2009 | Becker |
| 8,201,414 | B2 | 6/2012 | Haehner et al. |
| 8,492,920 | B2 | 7/2013 | Huang et al. |
| 8,561,413 | B2 | 10/2013 | Taneja |
| 8,738,268 | B2 | 5/2014 | Karimi et al. |
| 8,745,990 | B2 | 6/2014 | Burkholder et al. |
| 9,045,996 | B2 | 6/2015 | Anghel et al. |
| 9,096,312 | B2 | 8/2015 | Moxon |
| 9,097,134 | B2 | 8/2015 | Ferch et al. |
| 9,233,759 | B2 | 1/2016 | Bader et al. |
| 9,601,970 | B2 | 3/2017 | French et al. |
| 9,621,090 | B2 | 4/2017 | Chong et al. |
| 9,963,095 | B2 | 5/2018 | Huang et al. |
| 9,982,555 | B2 | 5/2018 | Thet et al. |
| 10,090,676 | B2 | 10/2018 | Knowles et al. |
| 10,263,550 | B2 | 4/2019 | Thet et al. |
| 10,458,269 | B2 | 10/2019 | Malkamaki et al. |
| 10,689,999 | B2 | 6/2020 | Huang et al. |
| 10,830,085 | B2 | 11/2020 | Blazer et al. |
| 10,934,935 | B2 | 3/2021 | Dalal et al. |
| 2005/0056021 | A1 | 3/2005 | Belokon et al. |
| 2006/0042252 | A1 | 3/2006 | Derouineau |
| 2006/0061213 | A1 | 3/2006 | Michalko |
| 2006/0062034 | A1* | 3/2006 | Mazumder .......... H02M 7/4837 363/131 |
| 2006/0150633 | A1 | 7/2006 | McGinley et al. |
| 2006/0168968 | A1 | 8/2006 | Zielinski et al. |
| 2008/0174177 | A1 | 7/2008 | Langlois et al. |
| 2008/0238202 | A1* | 10/2008 | Kern ........................ H02P 9/302 307/53 |
| 2009/0224599 | A1 | 9/2009 | Yue et al. |
| 2009/0256419 | A1* | 10/2009 | Anghel .................. B60L 50/61 307/9.1 |
| 2010/0058731 | A1 | 3/2010 | Haehner et al. |
| 2010/0164234 | A1 | 7/2010 | Bowman et al. |
| 2010/0181826 | A1 | 7/2010 | Fuller et al. |
| 2010/0251726 | A1 | 10/2010 | Jones et al. |
| 2010/0270858 | A1 | 10/2010 | Foch et al. |
| 2011/0049891 | A1 | 3/2011 | Bedrine et al. |
| 2012/0017602 | A1 | 1/2012 | Hansen et al. |
| 2012/0221157 | A1 | 8/2012 | Finney et al. |
| 2013/0076120 | A1 | 3/2013 | Wagner et al. |
| 2013/0147192 | A1 | 6/2013 | Condon et al. |
| 2013/0232941 | A1 | 9/2013 | Huang |
| 2013/0247539 | A1 | 9/2013 | Hoppe |
| 2014/0032002 | A1 | 1/2014 | Iwashima et al. |
| 2014/0197681 | A1 | 7/2014 | Iwashima et al. |
| 2014/0216047 | A1 | 8/2014 | Morisaki et al. |
| 2014/0225378 | A1 | 8/2014 | Anastasio et al. |
| 2014/0265327 | A1 | 9/2014 | Teichmann |
| 2014/0360205 | A1 | 12/2014 | French et al. |
| 2015/0100180 | A1 | 4/2015 | Oyori et al. |
| 2015/0130186 | A1 | 5/2015 | Vieillard |
| 2016/0280394 | A1 | 9/2016 | Radun et al. |
| 2016/0356171 | A1 | 12/2016 | Thet et al. |
| 2017/0037774 | A1 | 2/2017 | Jones et al. |
| 2017/0044989 | A1 | 2/2017 | Gemin et al. |
| 2017/0145925 | A1 | 5/2017 | Kusumi et al. |
| 2017/0184032 | A1 | 6/2017 | Poumarede et al. |
| 2017/0226933 | A1 | 8/2017 | Klonowski et al. |
| 2017/0328282 | A1 | 11/2017 | Jensen et al. |
| 2017/0335795 | A1 | 11/2017 | Klemen et al. |
| 2018/0187604 | A1* | 7/2018 | Poumarede .............. F02C 9/42 |
| 2018/0291807 | A1 | 10/2018 | Dalal |
| 2019/0061963 | A1 | 2/2019 | Sankrithi |
| 2019/0136768 | A1 | 5/2019 | Harvey |
| 2020/0148372 | A1 | 5/2020 | Long |
| 2020/0362720 | A1 | 11/2020 | Klemen et al. |
| 2020/0386188 | A1 | 12/2020 | Kupratis et al. |
| 2021/0070463 | A1 | 3/2021 | Husband et al. |

FOREIGN PATENT DOCUMENTS

| | | | |
|---|---|---|---|
| GB | 2456336 A | | 7/2009 |
| GB | 2510121 A | * 7/2014 | .............. H02J 3/30 |
| WO | WO8703928 A1 | | 7/1987 |
| WO | WO02053403 A2 | | 7/2002 |

OTHER PUBLICATIONS

IEEE Recommended Practices and Requirements for Harmonic Control in Electrical Power Systems, IEEE Std 519-1992, Apr. 1993, pp. 1-112. (Abstract Only) https://doi.org/10.1109/IEEESTD. 1993.114370.

Muehlbauer et al., Two-Generator-Concepts for Electric Power Generation in More Electric Aircraft Engine, XIX International Conference on Electrical Machines—ICEM 2010, Rome, 2010, pp. 1-2.

Zhang et al., Development of Megawatt-Scale Medium Voltage High Efficiency High Power Density Power Converters for Aircraft Hybrid-Electric Propulsion Systems, AIAA Propulsion and Energy Forum, 2018 AIAA/IEEE Electric Aircraft Technologies Symposium, Jul. 9-11, 2018, Cincinnati, OH, 5 Pages.

Zhang et al., A Megawatt-Scale Medium-Voltage High Efficiency High Power Density SiC+Si Hybrid Three-Level ANPC Inverter for Aircraft Hybrid-Electric Propulsion Systems, IEEE, 2018, pp. 806-813.

* cited by examiner

US 11,845,388 B2

1

AC ELECTRICAL POWER SYSTEM FOR A VEHICLE

FIELD

The present subject matter relates generally to an AC electrical system for a vehicle, such as an aircraft.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage.

More recently, propulsion systems have been proposed of a hybrid-electric design. With these propulsion systems, an electric power source may provide electric power to an electric fan to power the electric fan and may also provide electrical power to various aircraft loads. Electric power systems capable of providing this electric power while maintaining a robustness and a redundancy in design would be beneficial.

BRIEF DESCRIPTION

Aspects and advantages of the present disclosure will be set forth in part in the following description, or may be obvious from the description, or may be learned through practice of the present disclosure.

In one exemplary embodiment of the present disclosure, an AC electrical system for a vehicle is provided. The AC electrical system includes a first electric machine mechanically coupled with a first spool of a gas turbine engine and a second electric machine mechanically coupled with a second spool of the gas turbine engine. The system also includes a first electrical channel that electrically couples the first electric machine to a first AC bus and the first AC bus to one or more electrical loads. The system further includes a second electrical channel that electrically couples the second electric machine to a second AC bus and the second AC bus to one or more electrical loads. The system also includes one or more power converters and one or more connection links for selectively electrically coupling the first and second electrical channels. In this way, electrical power generated by one electric machine can be converted and shared with the other electric machine and electrical loads of the other channel.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
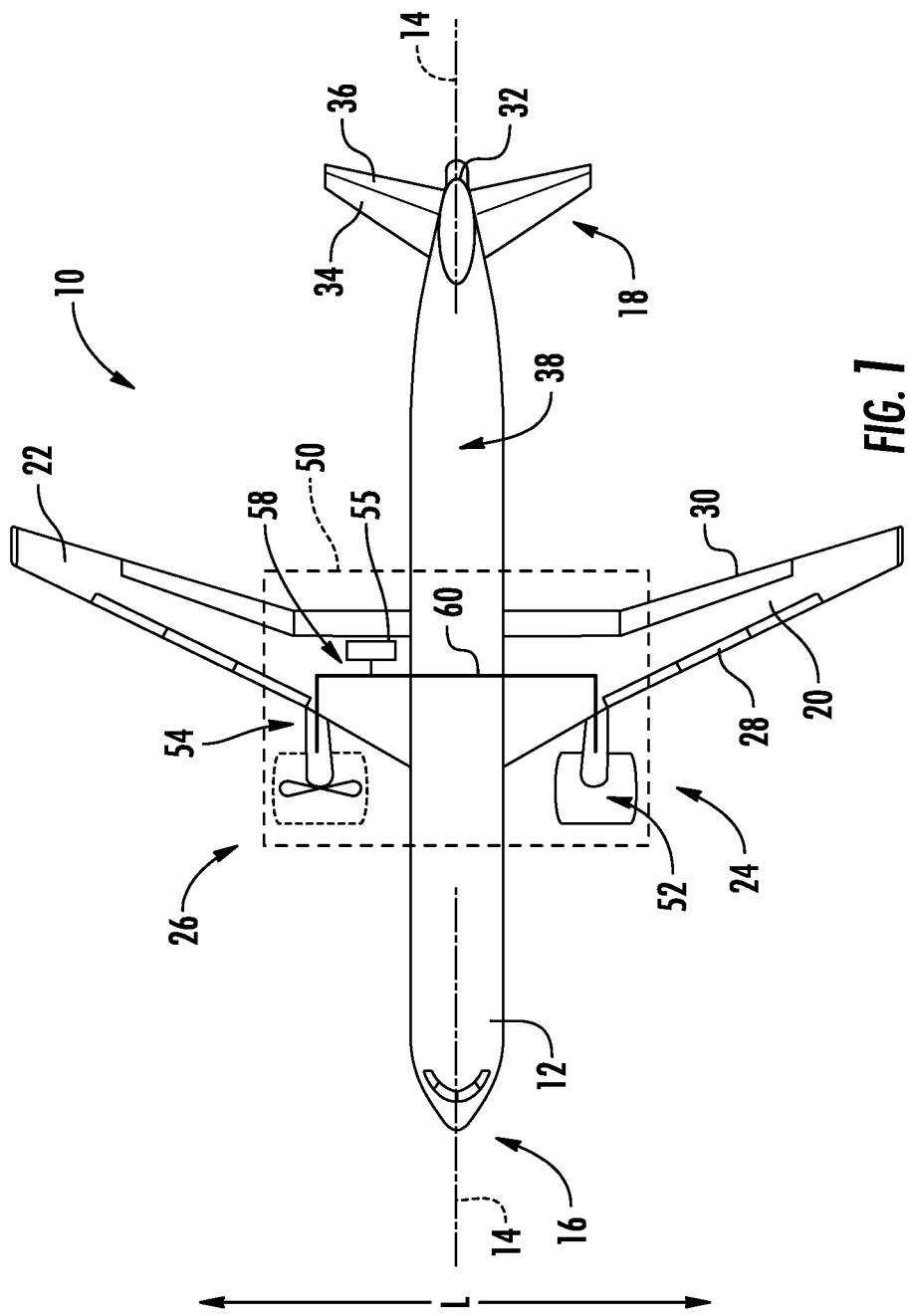
FIG. 1 is a top view of an aircraft according to various exemplary embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to vehicle AC electrical power systems. Particularly, various AC electric power system architectures are provided that include at least two electric machines coupled to respective spools of a multi-spool gas turbine engine. Electrical power generated by the electric machines is supplied to engine and aircraft electrical loads. In some instances, electrical power generated by one electric machine can be directed to the other electric machine or electrical loads associated with the other electric machine, e.g., for a power assist operation. In other instances, electrical power generated by one electric machine can be directed to the electrical loads associated with the other electric machine, e.g., in response to a detected generation failure. The architecture of the AC electric power systems provided herein may enable smooth, efficient, and safe transition of electrical power between the respective electric circuits associated with the first and second electric machines in such instances.

Compared with existing commercial aircraft AC power distribution systems, the architecture of the AC electric power systems provided herein include at least two electric machines coupled with respective spools of a gas turbine engine, and include either an AC/AC converter to allow for direct AC/AC bidirectional electric power transfer between the circuit associated with the first electric machine and the circuit associated with the second electric machine or including an AC/DC converter (e.g., an active rectifier) to allow for DC level electrical power transfer between the circuits or channels and subsequent conversion of the DC level electrical power to AC level electrical power before being provided to the power assisted electric machine and/or AC electrical loads associated therewith.

Advantageously, the AC electric power system architectures provided herein require relatively minimal modification to existing aircraft AC distribution systems, which is particularly useful for upgrading or overhauling legacy AC systems. Moreover, the AC electric power system architectures provided herein provide fault tolerant dual-channel independent operation and control of both electric machines of the AC system. The AC electric power system architectures provided herein may have other benefits and advantages than those expressly noted herein.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough and a lateral direction L. The aircraft 10 extends between a forward end 16 and an aft end 18, e.g., along a longitudinal direction parallel to the longitudinal centerline 14. Moreover, the aircraft 10 includes a fuselage 12 extending longitudinally from the forward end 16 to the aft end 18 of the aircraft 10. The fuselage 12 has a port side and a starboard side. The aircraft 10 also includes a wing assembly. More specifically, the wing assembly includes a first, port side wing 20 and a second, starboard side wing 22. The first and second wings 20, 22 each extend laterally outward along the lateral direction L with respect to the longitudinal centerline 14. The first wing 20 and a portion of the fuselage 12 together define a first side 24 of the aircraft 10. The second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each one of the wings 20, 22 includes one or more leading edge flaps 28 and one or more trailing edge flaps 30. The aircraft 10 further includes a vertical stabilizer 32 having a rudder flap for yaw control, and a pair of horizontal stabilizers 34, each having an elevator flap 36 for pitch control. The fuselage 12 additionally includes an outer surface or skin 38. It should be appreciated that the aircraft 10 of FIG. 1 is exemplary and that the inventive aspects of the present disclosure apply to aircraft having other suitable configurations. For example, in other embodiments, the aircraft 10 may include any other configuration of stabilizer.

Figure 2:
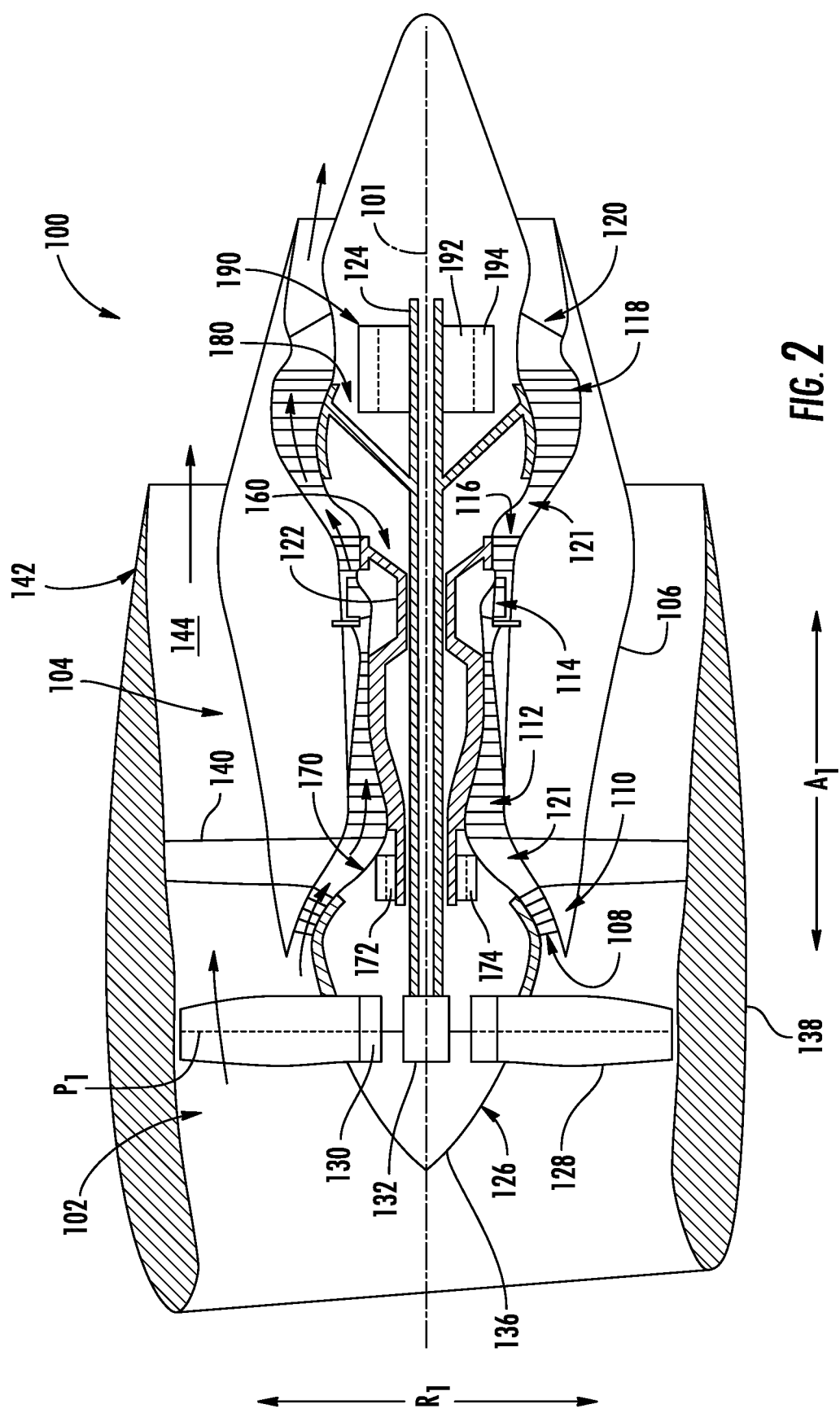
FIG. 2 is a schematic, cross-sectional view of a gas turbine engine mounted to the aircraft of FIG. 1.
Figure 3:
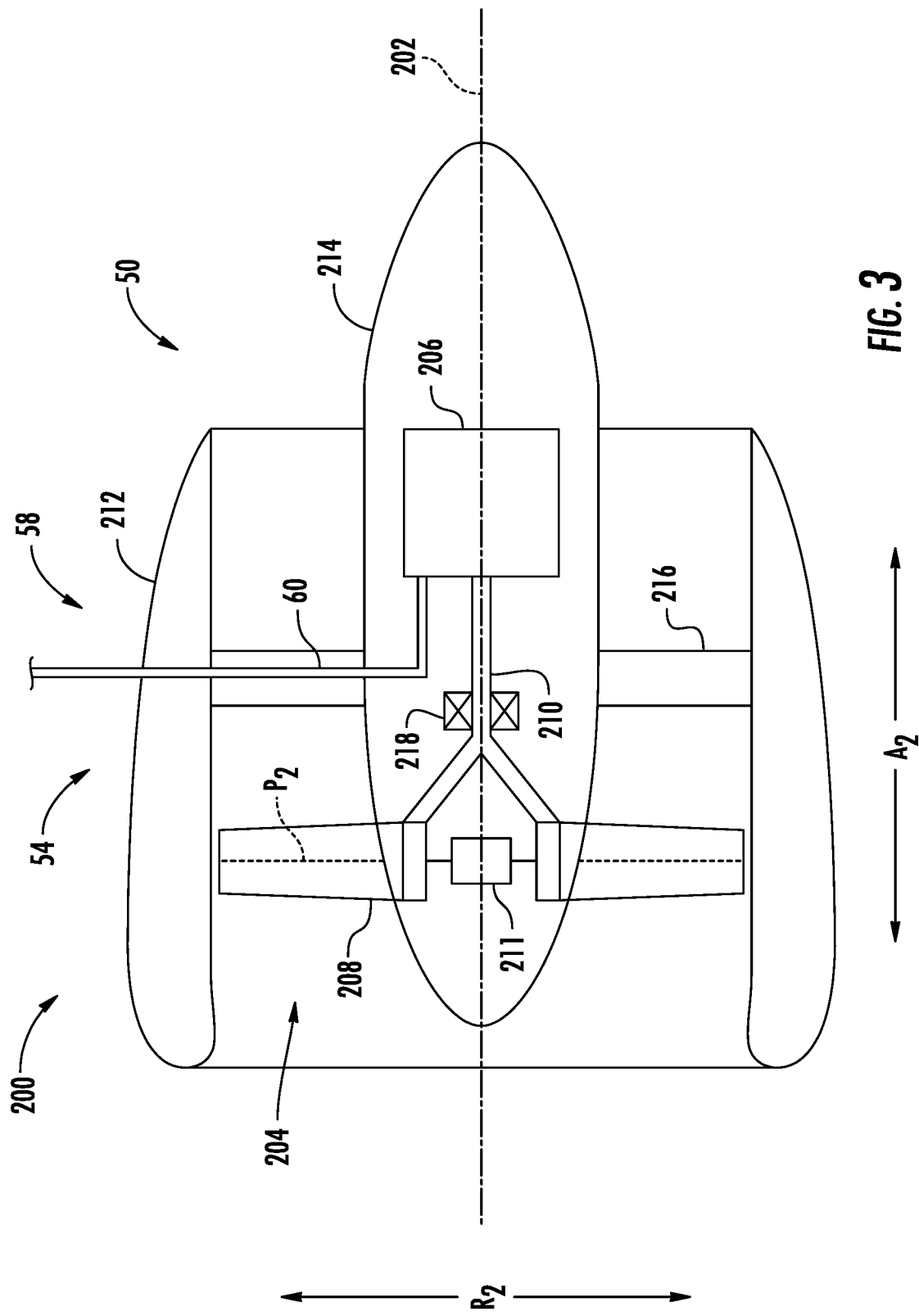
FIG. 3 is a schematic, cross-sectional view of an electric fan assembly in accordance with an exemplary embodiment of the present disclosure.

Referring now to FIGS. 2 and 3 in addition to FIG. 1, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52. FIG. 3 provides a schematic, cross-sectional view of the second propulsor assembly 54. As depicted, the first propulsor assembly 52 and second propulsor assembly 54 are both configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a core turbine engine 104 (also referred to as the turbomachine) and a primary fan (referred to simply as "fan 102" with reference to FIG. 2). More specifically, for the embodiment depicted, the first propulsor assembly 52 is configured as a turbofan engine 100 (the turbomachine 104 and the fan 102 are configured as part of the turbofan engine 100).

As shown in FIG. 2, the turbofan engine 100 defines an axial direction A1 (extending parallel to a longitudinal centerline 101 provided for reference), a radial direction R1, and a circumferential direction C (extending about the axial direction A1; not depicted in FIG. 2). In general, as noted, the turbofan engine 100 includes fan section 102 and core turbine engine 104 disposed downstream of the fan section 102.

The core turbine engine 104 includes a substantially tubular engine cowl 106 that defines an annular core inlet 108. The engine cowl 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define a core air flowpath 121 extending from the annular core inlet 108 through the LP compressor 110, HP compressor 112, combustion section 114, HP turbine section 116, LP turbine section 118 and jet exhaust nozzle section 120. A high pressure (HP) shaft 122 drivingly connects the HP turbine 116 to the HP compressor 112. The HP shaft 122 and rotating components of the HP compressor 112 and the HP turbine 116 that are mechanically coupled with the HP shaft 122 collectively form a high pressure spool 160. A low pressure (LP) shaft 124 drivingly connects the LP turbine 118 to the LP compressor 110. The LP shaft 124 and rotating components of the LP compressor 110 and the LP turbine 118 that are mechanically coupled with the LP shaft 124 collectively form a low pressure spool 180.

The fan section 102 may include a fixed or variable pitch fan 126 having a plurality of fan blades 128 coupled to a disk 130 in a spaced apart manner. As depicted, the fan blades 128 extend outwardly from the disk 130 generally along the radial direction R1. For the variable pitch fan 126 of FIG. 2, each fan blade 128 is rotatable relative to the disk 130 about a pitch axis P1 by virtue of the fan blades 128 being mechanically coupled to a suitable actuation member 132 configured to collectively vary the pitch of the fan blades 128 in unison. The fan blades 128, disk 130, and actuation member 132 are together rotatable about the longitudinal axis 14 by the LP spool 180. As noted above, in some embodiments, the fan blades 128 may be fixed and not rotatable about their respective pitch axes.

Referring still to FIG. 2, the disk 130 is covered by a spinner or rotatable front hub 136 aerodynamically contoured to promote an airflow through the plurality of fan blades 128. Additionally, the fan section 102 includes an annular fan casing or outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween.

It should also be appreciated that the exemplary turbofan engine 100 depicted in FIG. 2 is provided by way of example only, and that in other exemplary embodiments, the turbofan engine 100 may have any other suitable configuration. For example, in other exemplary embodiments, the turbofan engine 100 may be configured as a turboprop engine, a turbojet engine, a differently configured turbofan engine, an unducted turbofan engine (e.g., without the nacelle 138, but including the stationary outlet guide vanes 140), or any other suitable gas turbine engine. For example, the gas turbine engine may be a geared gas turbine engine (e.g., having a reduction gearbox between the LP shaft 124 and fan 126), may have any other suitable number or configuration of shafts/spools (e.g., may include an intermediate speed shaft/turbine/compressor), etc.

In addition, as depicted in FIG. 2, the exemplary turbofan engine 100 includes a plurality of electric machines, including a first electric machine 170 and a second electric machine 190. For this embodiment, the first electric machine 170 is mechanically coupled with the HP spool 160 and the second electric machine 190 is mechanically coupled with the LP spool 180. In this manner, the first electric machine 170 is an HP electric machine and the second electric machine 190 is an LP electric machine.

In at least certain exemplary aspects, the first electric machine 170 may be directly mechanically coupled to the HP spool 160 to operatively couple the first electric machine 170 with the HP spool 160. Similarly, in at least certain exemplary aspects, the second electric machine 190 may be directly mechanically coupled to the LP spool 180 to operatively couple the second electric machine 190 with the LP spool 180. Alternatively, however, in or more exemplary aspects the first electric machine 170, the second electric machine 190, or both may be indirectly coupled to the HP spool 160 or the LP spool 180, respectively, through a speed change mechanism (e.g., a gearbox, a transmission, or the like) to allow for a desired ratio of electric machine speed and spool speed.

Specifically, as shown in FIG. 2, the second electric machine 190 is co-axially mounted to and rotatable with the LP shaft 124 of the LP spool 180. As used herein, "co-axially" refers to the axes being aligned. Moreover, for the embodiment shown, the second electric machine 190 is positioned inward of the core air flowpath 121 within or aft of the turbine section of the turbofan engine 100, and as such, the second electric machine 190 may be referred to as an embedded electric machine. Similarly, the first electric machine 170 is co-axially mounted to and rotatable with the HP shaft 122 of the HP spool 160. The first electric machine 170 is also positioned inward of the core air flowpath 121, but within the compressor section of the turbofan engine 100, and as such, the first electric machine 170 may also be referred to as an embedded electric machine.

The first electric machine 170 includes a rotor 172 and a stator 174. The rotor 172 of the first electric machine 170 is rotatable with the HP shaft 122. The stator 174 includes electric current-carrying elements, such as windings or coils. In this manner, electrical power can be transmitted to the electric current-carrying elements, and as will be appreciated, electrical energy can be converted into mechanical energy in motoring mode or vice versa in generating mode as the rotor 172 rotates relative to the stator 174. The rotor 172 has rotor components for creating a rotor magnetic field in order to couple to the stator magnetic field to enable energy conversion. The rotor components of the rotor 172 can be, without limitation, rotor magnets in case of a permanent magnet synchronous machine, a squirrel cage in case of an induction machine, or a field winding in case of a field wound synchronous machine.

Likewise, the second electric machine 190 includes a rotor 192 and a stator 194. The rotor 192 of the second electric machine 190 is rotatable with the LP shaft 124. The rotor 192 and the stator 194 can be configured in any of the example manners described above with respect to the first electric machine 170.

In some alternative embodiments, an axis of the second electric machine 190 and/or the first electric machine 170 may be offset radially from the axes of the LP shaft 124 and HP shaft 122, respectively. Further, in some embodiments, the second electric machine 190 and/or the first electric machine 170 may be oblique to the axes of the LP shaft 124 and HP shaft 122, respectively. Moreover, in one or more exemplary embodiments, the second electric machine 190 and/or the first electric machine 170 may be located outward of the core air flowpath 121, e.g., within the engine cowl 106 of the turbofan engine 100 or nacelle 138.

In addition, for this embodiment, the second electric machine 190 and the first electric machine 170 are both operable in a motoring mode as an electric motor and in a generating mode as an electric generator. However, in alternative embodiments, one or both of the second electric machine 190 and the first electric machine 170 may be configured only as an electric motor or only as an electric generator.

Referring still to FIGS. 1 and 2, the propulsion system 50 includes an electric power distribution system 58 to allow the first and second electric machines 170, 190 to be electrically coupled with one another, to other electrically-driven components of the turbofan engine 100, as well as to other components of the propulsion system 50 and/or the aircraft 10. For the embodiment depicted, the power distribution system 58 includes one or more electrical cables or lines 60 along which electrical power can be directed.

In addition, the propulsion system 50 further includes one or more energy storage devices 55 (such as one or more batteries or other electrical energy storage devices) electrically connected to the power distribution system 58 for, e.g., providing electrical power to the second propulsor assembly 54 and/or receiving electrical power from an electric generator thereof. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor assembly 54 positioned, or configured to be positioned, at a location spaced apart from the first propulsor assembly 52. As depicted, the second propulsor assembly 54 is mounted to the second side 26 of the aircraft 10, or more particularly, to the second wing 22 of the aircraft 10. As shown best in FIG. 3, the second propulsor assembly 54 is generally configured as an electric propulsion assembly including an electric motor and a propulsor. More particularly, for the embodiment depicted, the electric propulsion assembly 200 includes an electric motor 206 and a propulsor/fan 204. The electric propulsion assembly 200 defines an axial direction A2 extending along a longitudinal centerline axis 202 that extends therethrough for reference, as well as a radial direction R2. The fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the fan. In certain exemplary embodiments, the plurality of fan blades 208 may be attached in a fixed manner to the fan shaft 210, or alternatively, the plurality of fan blades 208 may be rotatable about respective pitch axes such as in the embodiment depicted. For example, the plurality of fan blades 208 each define a respective pitch axis P2 and are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsion assembly 200 includes a fan casing or outer nacelle 212 attached to a core 214 of the fan 204 through one or more struts or outlet guide vanes 216. The outer nacelle 212 substantially completely surrounds the fan 204, and particularly the plurality of fan blades 208. Accordingly, for the embodiment depicted, the fan 204 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor).

Electric power sources, such as the electric machines 170, 190 of the first propulsor assembly 52 and/or the one or more energy storage devices 55 can be electrically connected with the electric motor 206 for providing electrical power thereto. More particularly, the electric motor 206 of the electric propulsion assembly 200 is electrically coupled with the electric power system through the electrical power distribution system 58, and more particularly through the one or more electrical cables or lines 60 extending therebetween.

A propulsion system in accordance with one or more of the above embodiments may be referred to as a gas-electric, or hybrid-electric propulsion system, given that a first propulsor assembly is configured as a gas turbine engine and a second propulsor assembly is configured as an electrically driven fan. It should be appreciated, however, that in other exemplary embodiments the exemplary propulsion system may have any other suitable configuration, and further, may be integrated into an aircraft 10 in any other suitable manner. For example, in other exemplary embodiments, the hybrid-electric propulsion system may have any suitable number of gas turbine engines (such as one, two, three, four, etc.) distributed in any suitable manner (such as along a port side wing, a starboard side wing, a fuselage of the aircraft, an aft location, etc.), and mounted in any suitable manner (such as in an under-wing mount, an over-wing mount, integrated into a wing, mounted to a fuselage of the aircraft, mounted to a stabilizer of the engine, mounted at the aft end as a boundary layer ingestion engine, etc.). Similarly, the hybrid-electric propulsion system may have any suitable number of electric propulsion engines (such as one, two, three, four, etc.) distributed in any suitable manner (such as along a port side wing, a starboard side wing, a fuselage of the aircraft, an aft location, etc.), and mounted in any suitable manner (such as in an under-wing mount, an over-wing mount, integrated into a wing, mounted to a fuselage of the aircraft, mounted to a stabilizer of the engine, mounted at the aft end as a boundary layer ingestion engine, etc.). In the event a plurality of gas turbine engines are provided with electric machine to generate electrical power, each may be directed to a single electric propulsion engine or a single group of electric propulsion engines, or each may be in electrical communication with a common electrical bus to provide power to the electric propulsion engine(s).

Moreover, it will be appreciated that although the propulsion system described herein is depicted as having been incorporated into an aircraft 10, in other exemplary embodiments, the propulsion system may additionally or alternatively be incorporated into any other suitable vehicle. For example, in other exemplary embodiments, the propulsion system may be incorporated into a nautical vehicle utilizing one or more turbine engines (such as a ship or submarine), a locomotive vehicle utilizing one or more turbine engines, etc.

Figure 4:
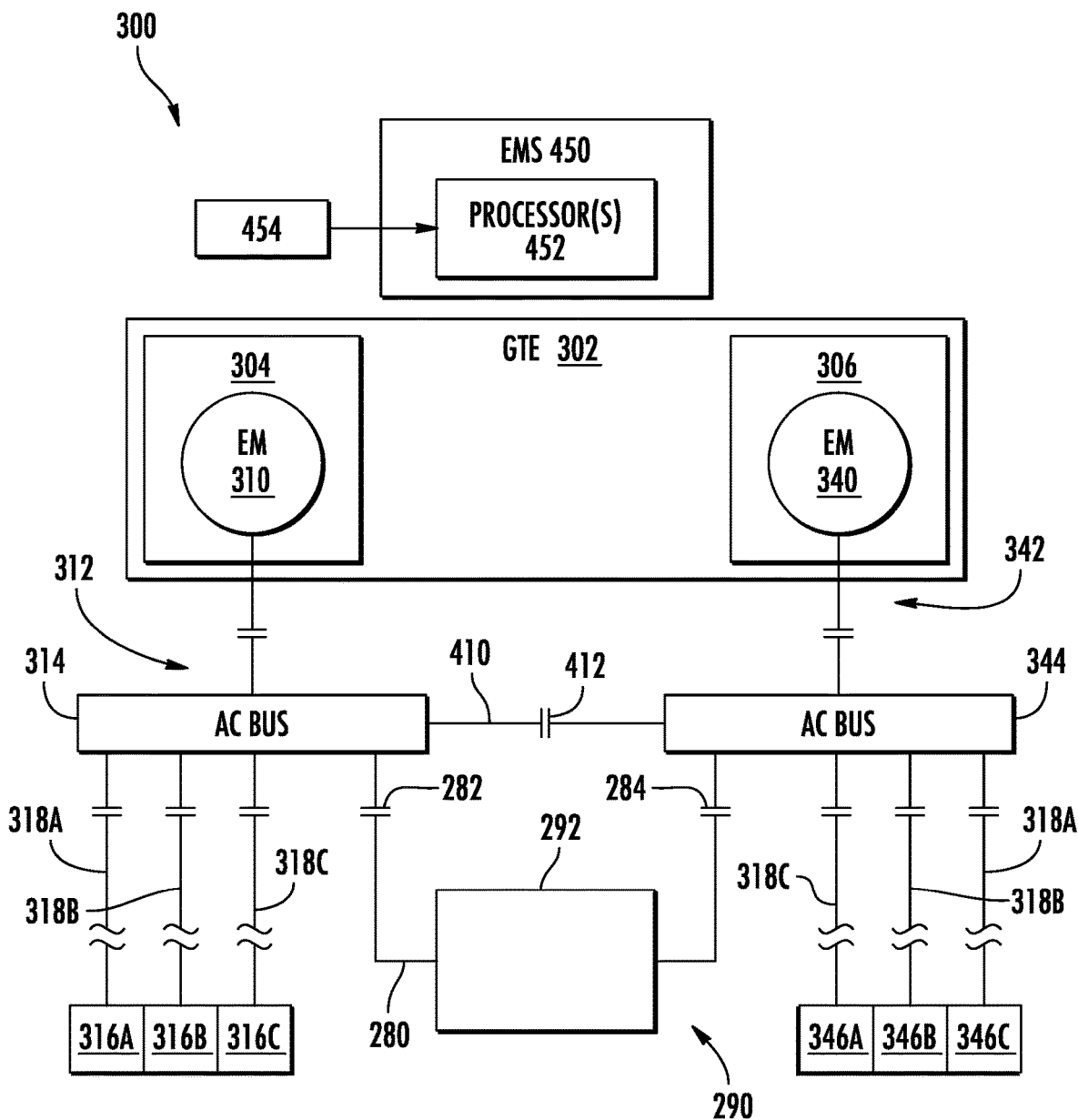
FIG. 4 is a schematic diagram depicting an AC electrical system for a vehicle according to one example embodiment of the present disclosure.

FIG. 4 is a schematic diagram depicting an AC electrical system 300 for a vehicle according to one example embodiment of the present disclosure. The AC electrical system 300 can be incorporated into the aircraft 10 of FIG. 1, for example. Particularly, the AC electrical system 300 can form at least a part of the electric power distribution system 58 of the aircraft 10. The AC electrical system 300 can be incorporated into other suitable vehicles as well. The AC electrical system 300 is an "AC electrical system" in that electrical power is distributed at the "AC level" or as alternating current.

As will be described further below, the AC electrical system 300 enables the transfer of power between a first electrical channel and a second electrical channel of the AC electrical system 300. This may, for example, enable power transfer between spools of a gas turbine engine. That is, electrical power generated by a first electric machine coupled with a first spool can be transferred to a second electric machine coupled with a second spool. The second electric machine can then convert the electrical energy into mechanical energy to drive or motor the second spool. In this way, the AC electrical system 300 enables power sharing between spools of a gas turbine engine. Further, electrical power generated by one electric machine can be fed to subsidize or provide full power various loads associated with the other electric machine, such as domestic loads onboard the gas turbine engine and/or other vehicle loads.

As depicted schematically in FIG. 4, the AC electrical system 300 includes a first electric machine 310 mechanically coupled with a first spool 304 of a gas turbine engine 302. The AC electrical system 300 also includes a second electric machine 340 mechanically coupled with a second spool 306 of the gas turbine engine 302. For this embodiment, the first spool 304 is a high pressure spool and the second spool 306 is a low pressure spool of the gas turbine engine 302. However, in other example embodiments, the first spool 304 may be a low pressure spool and the second spool 306 may be a high pressure spool. In yet other example embodiments, particularly wherein the gas turbine engine 302 is a three-spool engine having a low pressure spool, an intermediate pressure spool, and a high pressure spool, the first spool is an intermediate pressure spool and the second spool is one of a low pressure spool and a high pressure spool of the gas turbine engine. In yet other embodiments, the first spool is one of a low pressure spool and a high pressure spool of a gas turbine engine and the second spool is an intermediate pressure spool thereof.

The AC electrical system 300 includes a first electrical channel 312. The first electrical channel 312 electrically couples various components associated with the first electric machine 310. For instance, as depicted in FIG. 4, the first electrical channel 312 electrically couples the first electric machine 310 to a first AC bus 314. One or more electrical loads 316A, 316B, 316C can be electrically coupled with the first AC bus 314, e.g., via respective load lines 318A, 318B, 318C of the first electrical channel 312. The one or more electrical loads 316A, 316B, 316C can include, without limitation, electrically-driven pumps, computing components, motors, cabin lights, air conditioning systems, cabin air pressurization systems, the electric motor 206 associated with the electric propulsion assembly 200 of FIG. 3, etc. Although three electrical loads are depicted in FIG. 4 as being associated with the first electrical channel 312, it will be appreciated that more or less than three electrical loads are possible.

The AC electrical system 300 also includes a second electrical channel 342. The second electrical channel 342 electrically couples various components associated with the second electric machine 340. For instance, as shown in FIG. 4, the second electrical channel 342 electrically couples the second electric machine 340 to a second AC bus 344. The second AC bus 344 can be at a different voltage and a different frequency than the first AC bus 314. One or more electrical loads 346A, 346B, 346C can be electrically coupled with the second AC bus 344, e.g., via respective load lines 318A, 318B, 318C of the second electrical channel 342. The one or more electrical loads 346A, 346B, 346C can include, without limitation, electrically-driven pumps, computing components, motors, cabin lights, air conditioning systems, cabin air pressurization systems, the electric motor 206 associated with the electric propulsion assembly 200 of FIG. 3, etc. Although three electrical loads are depicted in FIG. 4 as being associated with the second electrical channel 342, it will be appreciated that more or less than three electrical loads are possible.

As further shown in FIG. 4, the AC electrical system 300 includes one or more connection links selectively electrically coupling the first electrical channel 312 and the second electrical channel 342. The AC electrical system 300 also includes a power conversion system having one or more power converters operable to convert electrical power transferred between the first electrical channel 312 and the second electrical channel 342 across the one or more connection links so that electrical power generated by the second electric machine 340 is transferable to the first electrical channel 312, and in some embodiments, so that electrical power generated by the first electric machine 310 is transferable to the second electrical channel 342.

For instance, for the depicted embodiment of FIG. 4, the one or more connection links of the AC electrical system 300 include a connection link 280. The connection link 280 electrically couples the first AC bus 314 of the first electrical channel 312 and the second AC bus 344 of the second electrical channel 342. The connection link 280 includes a first bus tie contactor 282 and a second bus tie contactor 284. The first and second bus tie contactors 282, 284 can be controlled to selectively allow electrical power to pass therethrough. In this regard, the connection link 280 selectively electrically couples the first electrical channel 312 and the second electrical channel 342.

For this embodiment, the one or more connection links of the AC electrical system 300 also include an AC bus link 410 that can be controlled to selectively electrically couple or connect the first AC bus 314 associated with the first electrical channel 312 and the second AC bus 344 associated with the second electrical channel 342. One or more bus tie contactors 412 of the AC bus link 410 may be controlled to selectively connect the first electrical channel 312 and the second electrical channel 342 at the AC level. Such bus tie contactors 412 can be controlled to connect the first AC bus 314 and the second AC bus 344, e.g., in response to a detected generation failure associated with one of the electric machines.

As noted, the AC electrical system 300 includes a power conversion system 290 having one or more power converters. For the depicted embodiment of FIG. 4, the one or more power converters of the power conversion system 290 include a power converter 292 positioned along the connection link 280. More particularly, the power converter 292 is positioned along the connection link 280 between the first and second bus tie contactors 282, 284. Generally, the power converter 292 is operable to convert electrical power transferred between the first electrical channel 312 and the second electrical channel 342 across the connection link 280 so that electrical power generated by one electric machine can be transferred to the electrical channel associated with the other electric machine. Particularly, the power converter 292 may be controlled to convert the AC voltage and frequency of the electrical power being transferred across the connection link 280 to the AC voltage and frequency of the electrical channel to which the electrical power is being transferred. In some embodiments, as will be provided below, the AC electrical system 300 can include multiple power converters to convert the electrical power being transferred between the first and second electrical channels 312, 342. In other embodiments, the AC electrical system 300 can include a single power converter to convert the electrical power being transferred between the first and second electrical channels 312, 342.

As further shown in FIG. 4, the AC electrical system 300 includes an Energy Management System 450 (EMS) for power distribution management. The EMS 450 can include one or more memory devices and one or more processors 452 operable to execute one or more operations, such as controlling various components of the AC electrical system 300 to control the flow of electric current and thus electric power through the AC electrical system 300. For instance, based at least in part on a determined power share split for a power assist operation, the one or more processors 452 can control various bus tie contactors of the AC electric system 300 (e.g., the bus tie contactors, the one or more power converters of the system, etc.) to direct electrical power from one electrical channel to the other. The EMS 450 can include other components as well, such as those set forth in the computing system 800 depicted in FIG. 18. The EMS 450 can be communicatively coupled with the bus tie contactors and/or other components in any suitable manner, such as by one or more wired or wireless communication links. Although not labeled in FIG. 4, various bus tie contactors (e.g., bus ties) are positioned along the various channels of the AC electrical system 300. It will further be appreciated that such devices can be controlled to allow or "break" the electric current flowing along their respective channels. The EMS 450 can be communicatively coupled with such bus tie contactors to precisely control the flow of electric current through the system 300.

An example manner in which the AC electrical system 300 can facilitate a power share or power assist between channels will now be described. With reference to FIG. 4, the one or more processors 452 can initiate a power assist operation. The power assist operation can be initiated based at least in part on data 454 received by the one or more processors 452. The data 454 can indicate, for example, a demanded thrust output of the gas turbine engine 302. The demanded thrust output can be received in response to, e.g., a pilot adjustment of a thrust lever or a command from an autopilot system. The data 454 can also include detection of bleed air, anticipated electrical load changes, and/or the like. To achieve the demanded thrust output and to meet the electrical power demands of the AC electrical system 300, the one or more processors 452 can determine a power share split.

The power share split can indicate whether and how much electrical power is to be drawn from the first electric machine 310 and provided to its associated electrical loads 316A, 316B, 316C and/or whether and how much electrical power generated by the first electric machine 310 is to be provided to the second electrical channel 342, e.g., for assisting the second electric machine 340 in driving the second spool 306 and/or providing electrical power to one or more electrical loads 346A, 346B, 346C associated with the second electric machine 340. The power share split can also indicate whether and how much electrical power is to be drawn from the second electric machine 340 and provided to its associated electrical loads 346A, 346B, 346C and/or whether and how much electrical power generated by the second electric machine 340 is to be provided to the first electrical channel 312, e.g., for assisting the first electric machine 310 in driving the first spool 304 and/or providing electrical power to one or more electrical loads 316A, 316B, 316C associated with the first electric machine 310. In this regard, the one or more processors 452 can determine the manner in which electrical power is to be distributed throughout the AC electrical system 300 to meet both the electrical and mechanical power needs of the gas turbine engine 302 and vehicle. The one or more processors 452 can control the bus tie contactors of the system 300 to achieve the desired power distribution.

As one example, the one or more processors 452 can determine that electrical power generated by the second electric machine 340 is to be provided to the first electric machine 310, e.g., for a core power assist, wherein the first spool 304 is a high pressure spool and the second spool 306 is a low pressure spool of the gas turbine engine 302. Accordingly, in accordance with the determined power share split, the one or more processors 452 can cause electrical power generated by the second electric machine 340 to be routed along the second electrical channel 342 to the second AC bus 344. A portion of the electrical power can be routed from the second AC bus 344 across the connection link 280 to the first electrical channel 312. In this regard, the first and second bus tie contactors 282, 284 can be controlled to close to allow electrical power to flow from the second electrical channel 342 to the first electrical channel 312. As the electrical power passes through the power converter 292, the power converter 292 is controlled to synchronize the AC voltage and frequency of the electrical power with the AC voltage and frequency of the first electrical channel 312. In this way, the resultant alternating current has a synchronized voltage level, frequency, and phase with respect to the first electrical channel 312, and consequently, such converted electrical power can be safely and efficiently provided to the first AC bus 314 and onward to the first electric machine 310 for the power assist. As will be appreciated, the electrical power provided to first electric machine 310 can cause or assist the first electric machine 310 with driving the first spool 304.

Various embodiments will now be provided that disclose various manners in which one or more connection links can selectively electrically couple the first and second channels 312, 342.

Figure 5:
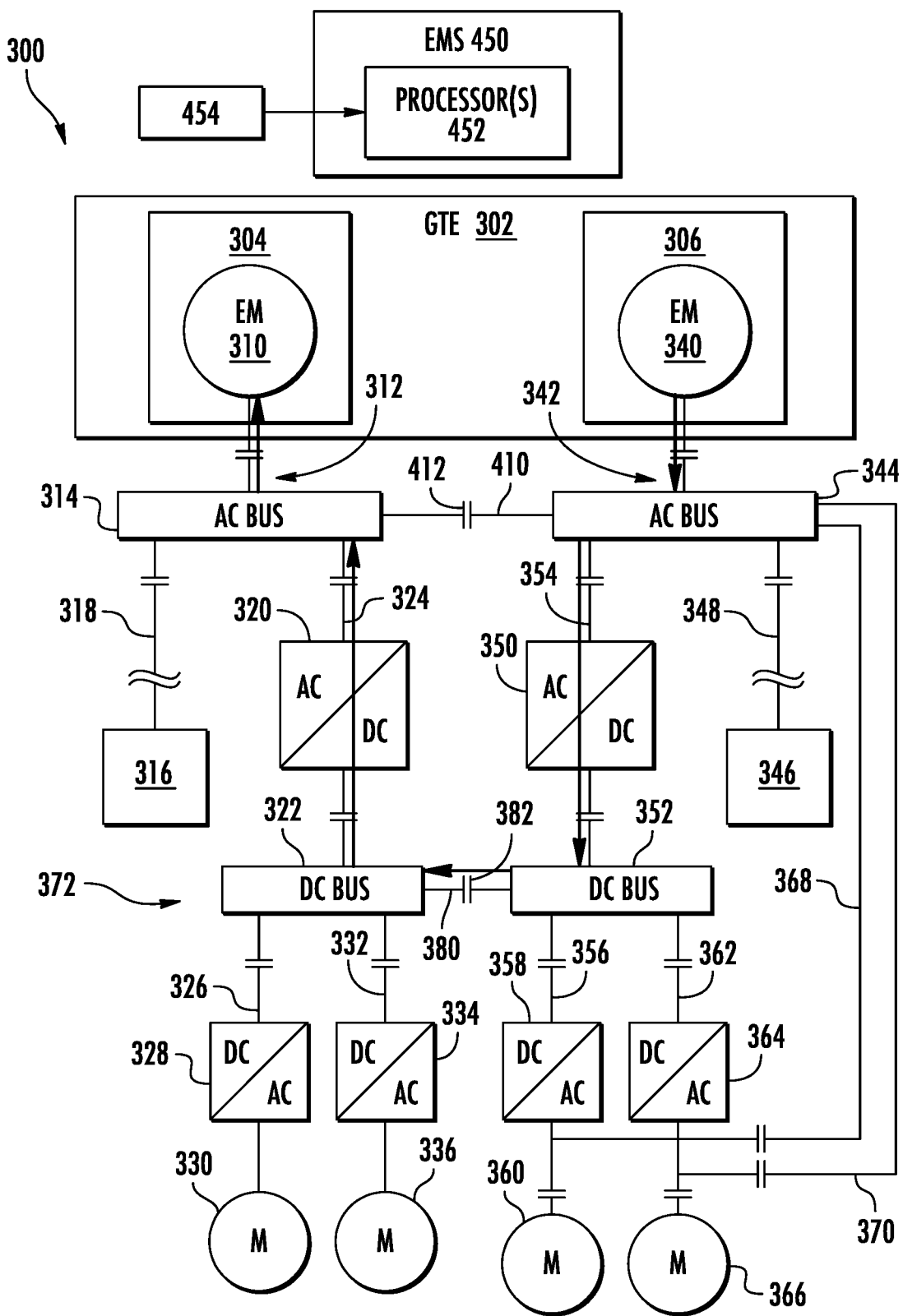
FIG. 5 is a schematic diagram depicting an AC electrical system for a vehicle according to one example embodiment of the present disclosure.

In one example embodiment, as depicted in FIG. 5, a DC bus link 380 can selectively electrically couple or connect the first electrical channel 312 and the second electrical channel 342. As shown, a main line 324 of the first electrical channel 312 electrically couples the first AC bus 314 to a first AC/DC converter 320. The first AC/DC converter 320 can be any suitable type of controllable device operable to convert alternating current into direct current, or vice versa. In some example embodiments, without limitation, the first AC/DC converter 320 can be an Auto-Transformer Rectifier Unit (ATRU), an isolation transformer, or some other suitable converter device.

Further, the main line 324 of the first electrical channel 312 electrically couples the first AC/DC converter 320 to a first DC bus 322. Notably, the first AC/DC converter 320 is a bidirectional AC/DC converter. Accordingly, the first AC/DC converter 320 is operable to convert alternating current to direct current in some operating modes and direct current to alternating current in some other operating modes. In this way, when the first electric machine 310 is operating in a generator mode, alternating current can be converted into direct current and directed to the first DC bus 322. In contrast, when the first electric machine 310 is operating in a motor or drive mode, direct current from the first DC bus 322 can be converted into alternating current and directed to the first AC bus 314 and ultimately to the first electric machine 310 or other electrical loads electrically coupled with the first AC bus 314.

A first load line 326 of the first electrical channel 312 electrically couples the first DC bus 322 with a first load AC/DC converter 328 and the first load AC/DC converter 328 with an electrical load 330. The first load AC/DC converter 328 is operable to convert direct current provided by the first DC bus 322 into alternating current. In this way, alternating current can be provided to the electrical load 330. In some embodiments, the first load AC/DC converter 358 is a bidirectional converter.

Similarly, a second load line 332 of the first electrical channel 312 electrically couples the first DC bus 322 with a second load AC/DC converter 334 and the second load AC/DC converter 334 with an electrical load 336. Much like the first load AC/DC converter 328, the second load AC/DC converter 334 is operable to convert direct current provided by the first DC bus 322 into alternating current. Thus, alternating current can be provided to the electrical load 336. In some embodiments, the second load AC/DC converter 334 is a bidirectional converter. As will be appreciated, in other example embodiments, more or less than two electrical loads can be associated with the first electrical channel 312. The first and second load AC/DC converters 328, 334 can each be any suitable type of controllable device operable to convert alternating current into direct current, or vice versa. In some example embodiments, without limitation, the first and second load AC/DC converters 328, 334 can be ATRUs, isolation transformers, or some other suitable converter device.

With reference still to FIG. 5, the second electrical channel 342 electrically couples the second electric machine 340 to the second AC bus 344. The second AC bus 344 can be at a different voltage and a different frequency than the first AC bus 314. One or more electrical loads 346 can be electrically coupled with the second AC bus 344, e.g., via a load line 348 of the second electrical channel 342. The one or more electrical loads 346 can include, without limitation, electrically-driven pumps, computing components, cabin lights, air conditioning systems, cabin air pressurization systems, the electric motor 206 associated with the electric propulsion assembly 200 of FIG. 3, etc.

A main line 354 of the second electrical channel 342 electrically couples the second AC bus 344 to a second AC/DC converter 350. The second AC/DC converter 350 can be any suitable type of controllable device operable to convert alternating current into direct current, or vice versa. In some example embodiments, without limitation, the second AC/DC converter 350 can be ATRU, an isolation transformer, or some other suitable converter device.

Further, the main line 354 of the second electrical channel 342 also electrically couples the second AC/DC converter 350 to a second DC bus 352. The first DC bus 322 and the second DC bus 352, although separate elements for the depicted embodiment of FIG. 5, collectively form a DC bus system 372. In some embodiments, the second AC/DC converter 350 is a bidirectional AC/DC converter. In this way, when the second electric machine 340 is operating in a generator mode, alternating current can be converted into direct current and directed to the second DC bus 352. In contrast, when the second electric machine 340 is operating in a motor or drive mode, direct current from the second DC bus 352 can be converted into alternating current and directed to the second AC bus 344 and ultimately to the second electric machine 340. In other example embodiments, however, the second AC/DC converter 350 need not be a bidirectional AC/DC converter. For instance, in some embodiments, the second AC/DC converter 350 can be a unidirectional AC/DC converter.

A first load line 356 of the second electrical channel 342 electrically couples the second DC bus 352 with a first load AC/DC converter 358 and the first load AC/DC converter 358 with an electrical load 360. Similarly, a second load line 362 of the second electrical channel 342 electrically couples the second DC bus 352 with a second load AC/DC converter 364 and the second load AC/DC converter 364 with an electrical load 366. As will be appreciated, in other example embodiments, more or less than two electrical loads can be associated with the second electrical channel 342. Moreover, the first and second load AC/DC converters 358, 364 can each be any suitable type of controllable device operable to convert alternating current into direct current, or vice versa. In some example embodiments, without limitation, the first and second load AC/DC converters 358, 364 can be ATRUs, isolation transformers, or some other suitable converter device.

As further shown in FIG. 5, a first secondary line 368 of the second electrical channel 342 electrically couples the second AC bus 344 with the first load line 356 of the second electrical channel 342. As depicted, the first secondary line 368 electrically connects with the first load line 356 of the second electrical channel 342 at a point between the first load AC/DC converter 358 and the electrical load 360. Similarly, a second secondary line 370 of the second electrical channel 342 electrically couples the second AC bus 344 with the second load line 362 of the second electrical channel 342. As shown, the second secondary line 370 electrically connects with the second load line 362 of the second electrical channel 342 at a point between the second load AC/DC converter 364 and the electrical load 366.

For the depicted embodiment of FIG. 5, as noted, the DC bus link 380 can selectively electrically couple or connect the first DC bus 322 associated with the first electrical channel 312 and the second DC bus 352 associated with the second electrical channel 342. One or more bus tie contactors 382 of the DC bus link 380 may be controlled to selectively connect the first electrical channel 312 and the second electrical channel 342 at the DC level. In some operating modes, electrical power is transferable between the first electrical channel 312 and the second electrical channel 342 via the DC bus link 380 so that electrical power generated by the second electric machine 340 is transferable to the first electric machine 310, e.g., for a power assist, and/or to electrical loads 316, 330, 336 associated therewith. In other embodiments, electrical power is transferable between the first electrical channel 312 and the second electrical channel 342 via the DC bus link 380 so that electrical power generated by the first electric machine 310 is transferable to the second electric machine 340 and/or to electrical loads 348, 360, 366 associated therewith.

Figure 6:
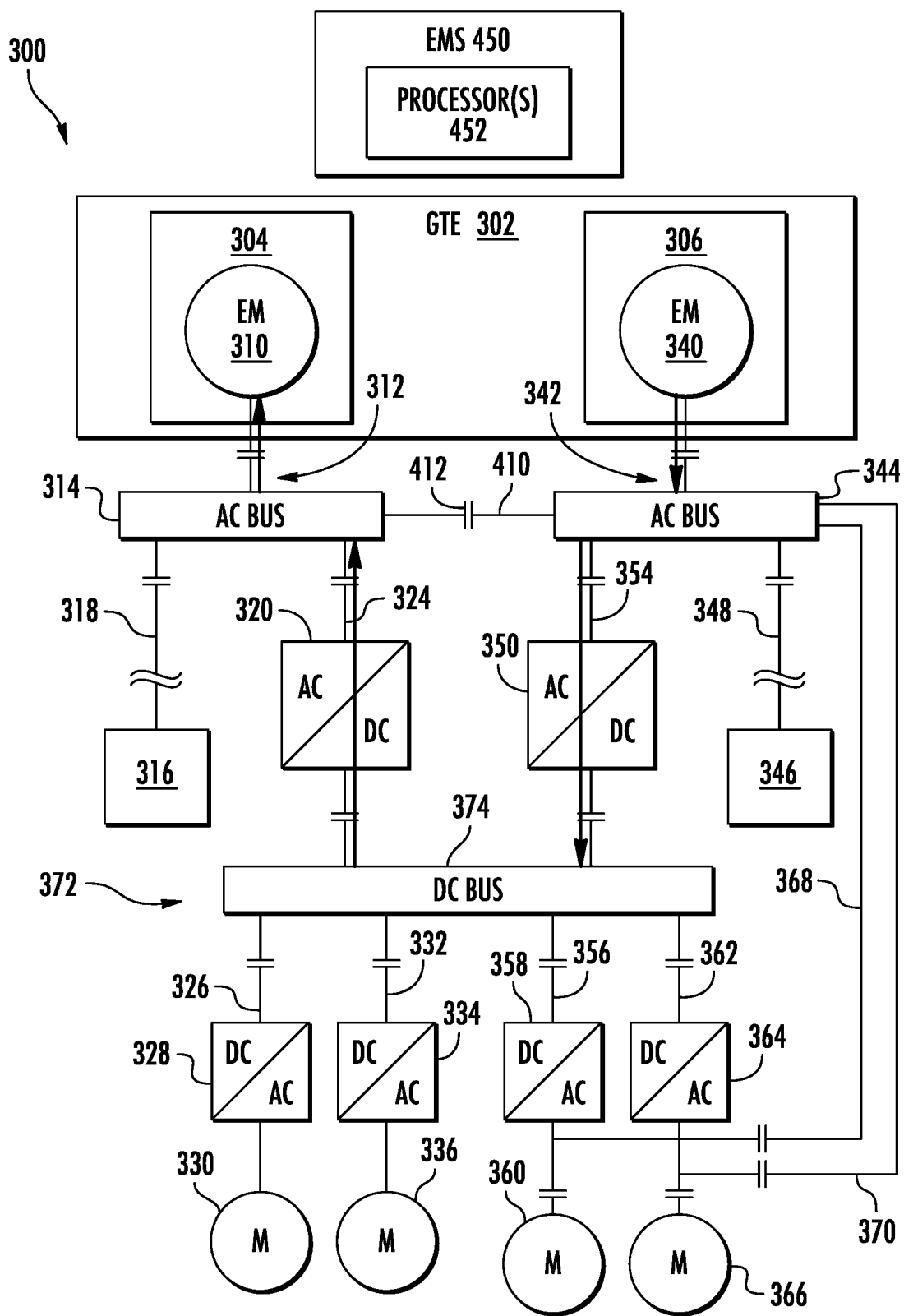
FIG. 6 is a schematic diagram depicting an AC electrical system for a vehicle according to another example embodiment of the present disclosure.

In yet other embodiments, the one or more connection links can include a single DC bus that electrically connects the first electrical channel 312 and the second electrical channel 342. Particularly, in some example embodiments, the first DC bus 322 and the second DC bus 352 of the embodiment of FIG. 5 can be combined into a single DC bus. FIG. 6 depicts such an embodiment. As shown in FIG. 6, the AC electrical system 300 is depicted in a similar manner to the AC electrical system 300 of FIG. 5 except that the DC bus system 372 includes a single DC bus 374 rather than two separate DC buses. The single DC bus 374 is a part of the first electrical channel 312 and the second electrical channel 342 and acts as a connection link therebetween. In this regard, electrical power is transferable between the first electrical channel 312 and the second electrical channel 342 via the single DC bus 374.

Figure 7:
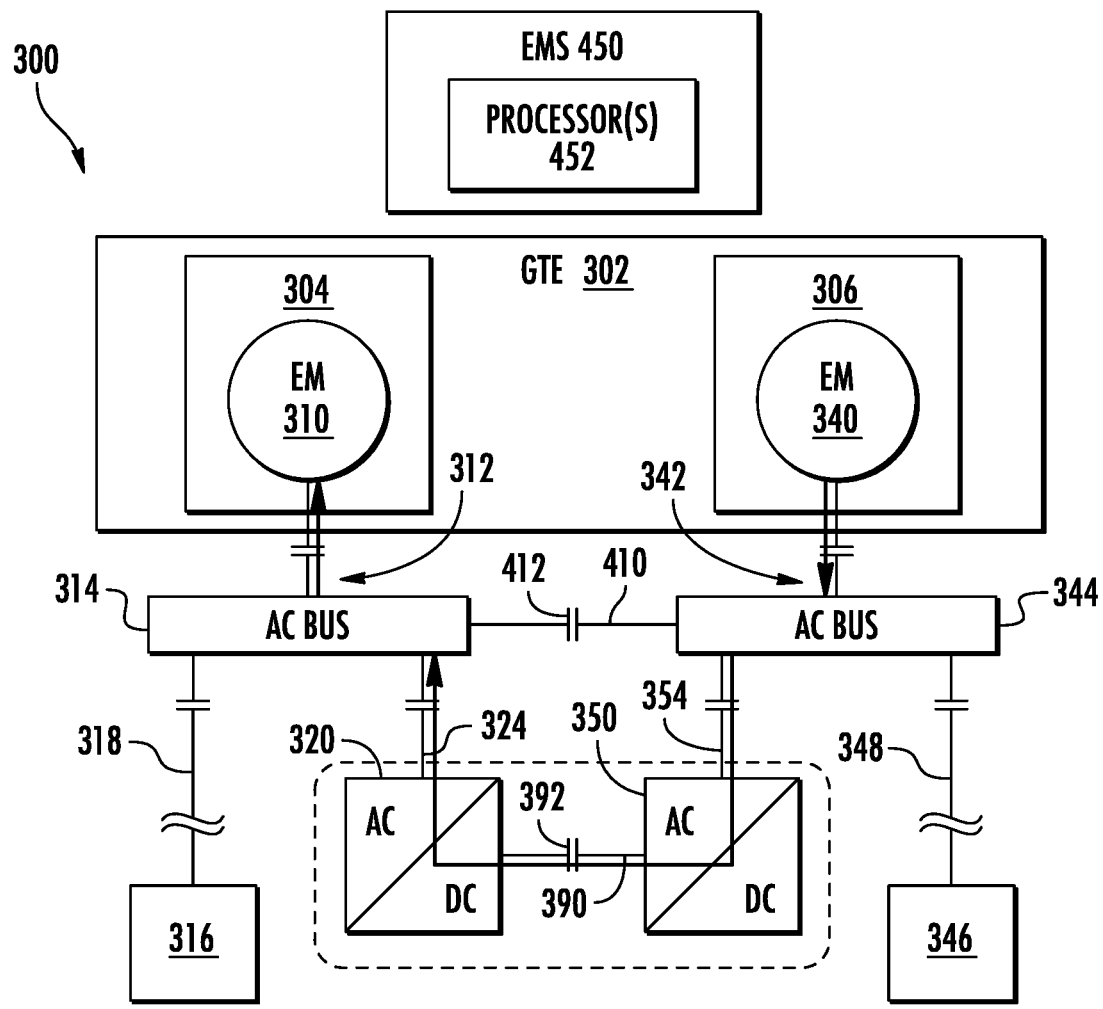
FIG. 7 is a schematic diagram depicting an AC electrical system for a vehicle according to yet another example embodiment of the present disclosure.

In some further embodiments, the AC electrical system 300 can include a connection link between the first AC/DC converter 320 and the second AC/DC converter 350 to electrically couple the first electrical channel 312 and the second electrical channel 342. For instance, as depicted in FIG. 7, the AC electrical system 300 includes a converter link 390 for selectively electrically coupling the first AC/DC converter 320 and the second AC/DC converter 350. The converter link 390 can include one or more bus tie contactors 392 that can be controlled to selectively allow electrical power to transfer from the second AC/DC converter 350 to the first AC/DC converter 320, or vice versa. Notably, the converter link 390 can connect to the DC side of the second AC/DC converter 350 and to the DC side of the first AC/DC converter 320. In this way, electrical power can be transferred between the first and second AC/DC converters 320, 350 at the DC level, or stated another way, as direct current electrical power.

Figure 8:
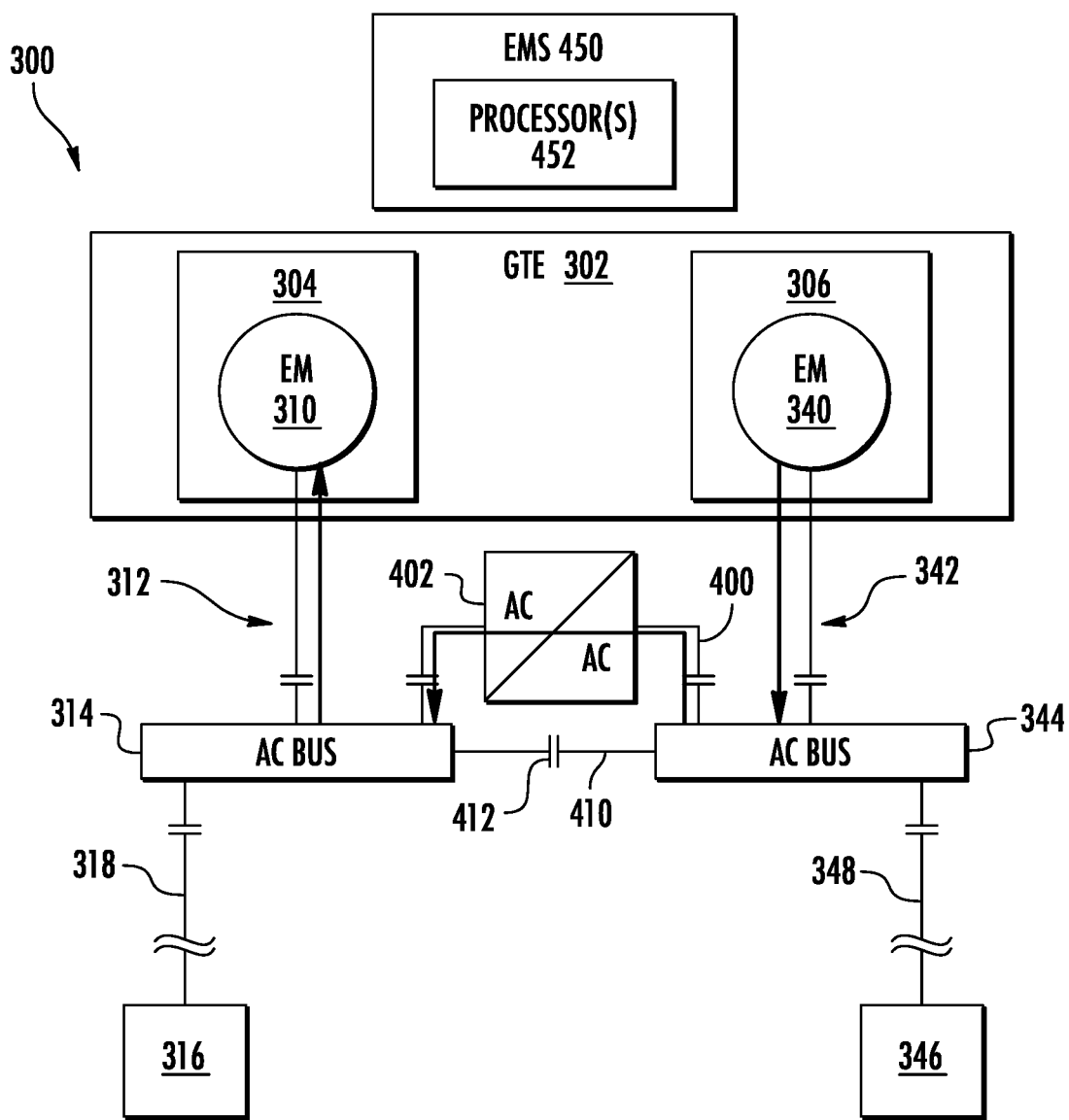
FIG. 8 is a schematic diagram depicting an AC electrical system for a vehicle according to a further example embodiment of the present disclosure.

In other example embodiments, the AC electrical system 300 can include a connection link between the first AC bus 314 and the second AC bus 344 to electrically couple the first electrical channel 312 and the second electrical channel 342. Specifically, as shown in FIG. 8, the AC electrical system 300 includes an AC converter link 400 for selectively electrically coupling the first AC bus 314 and the second AC bus 344. Notably, the AC converter link 400 includes an AC/AC converter 402. In some embodiments, the AC/AC converter 402 may be a matrix converter, such as the matrix converter depicted in FIG. 21. In yet other embodiments, the AC/AC converter 402 may be a cycloconverter, such as the cycloconverter depicted in FIG. 22. Generally, the AC/AC converter 402 can be controlled to convert alternating current transferred therethrough so that the electric current has a synchronized frequency and voltage to the AC bus to which the electrical power is being transferred. As noted previously, the first AC bus 314 and the second AC bus 344 can have independent voltage levels, different frequencies, and may be out-of-phase with respect to one another. Accordingly, the AC/AC converter 402 can facilitate safe and smooth transition of electrical power from one AC bus to the other.

Figure 9:
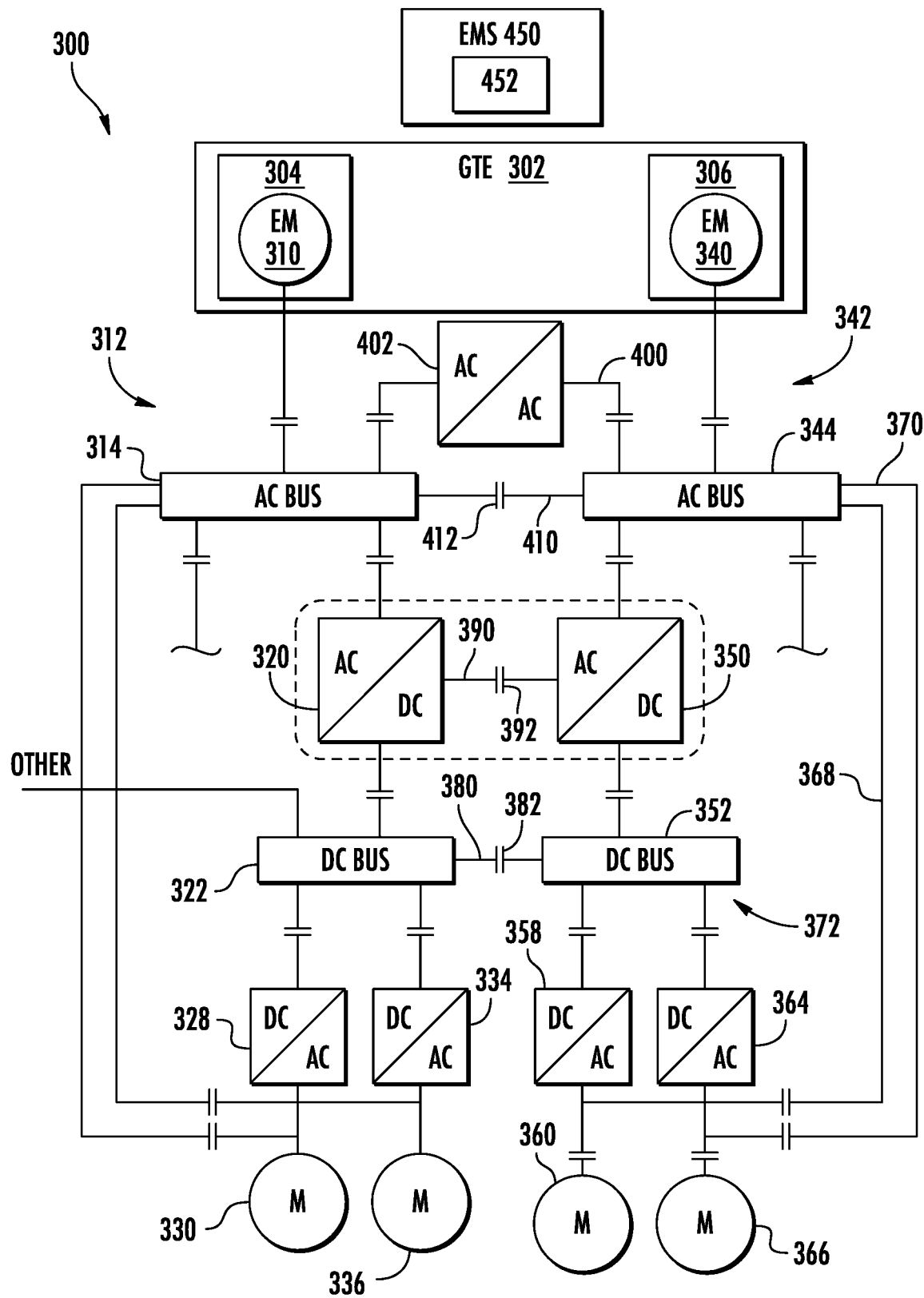
FIG. 9 is a schematic diagram depicting an AC electrical system for a vehicle according to yet another example embodiment of the present disclosure.

In yet other embodiments, as shown in FIG. 9, the AC electrical system 300 can include multiple connection links, including DC bus link 380 of FIG. 5 (or single DC bus 374 of FIG. 6; not shown in FIG. 9), the converter link 390 of FIG. 7, and the AC converter link 400 of FIG. 8. Electrical power can be transferred across one, some, or all these connection links from one channel to the other depending on the mechanical and electrical needs. It will be appreciated that any suitable combination of the above-noted connection links are possible in other embodiments.

With reference again to FIG. 5, an example manner in which the AC electrical system 300 can facilitate a power share or power assist between spools of a gas turbine engine will now be described. The one or more processors 452 can initiate a power assist operation. The power assist operation can be initiated based at least in part on data 454 received by the one or more processors 452. The data 454 can indicate, for example, a demanded thrust output of the gas turbine engine 302. The demanded thrust output can be received in response to, e.g., a pilot adjustment of a thrust lever or a command from an autopilot system. The data 454 can also include detection of bleed air, anticipated electrical load changes, and/or the like. To achieve the demanded thrust output and to meet the electrical power demands of the AC electrical system 300, the one or more processors 452 can determine a power share split. The power share split can indicate whether and how much electrical power is to be drawn from or provided to the first electric machine 310 and whether and how much electrical power is to be drawn from or provided to the second electric machine 340. In this regard, the one or more processors 452 can determine the manner in which electrical power is to be distributed throughout the AC electrical system 300 to meet both the electrical and mechanical power needs of the gas turbine engine 302 and vehicle. The one or more processors 452 can control the controllable elements of the system 300 to achieve the desired power distribution.

For this example embodiment, the one or more processors 452 can determine that electrical power generated by the second electric machine 340 is to be provided to the first electric machine 310, e.g., for a core power assist, wherein the first spool 304 is a high pressure spool and the second spool 306 is a low pressure spool of the gas turbine engine 302. Accordingly, in accordance with the determined power share split, the one or more processors 452 can cause electrical power generated by the second electric machine 340 to be routed along the second electrical channel 342 to the second AC bus 344. A portion of the electrical power can be routed from the second AC bus 344 to the second AC/DC converter 350 as depicted in FIG. 5.

The second AC/DC converter 350 can convert the alternating current into direct current. At least a portion of the direct current can be directed to the DC bus system 372, or more particularly for the embodiment of FIG. 5, the second DC bus 352. The one or more processors 452 can control the one or more bus tie contactors 382 of the DC bus link 380 to allow electrical power to flow from the second electrical channel 342 to the first electrical channel 312, or more particularly for this embodiment, from the second DC bus 352 of the second electrical channel 342 to the first DC bus 322 of the first electrical channel 312. In this way, direct current can be transferred across the DC bus link 380 from the second DC bus 352 of the second electrical channel 342 to the first DC bus 322 of the first electrical channel 312.

The direct current is received by the first DC bus 322 and at least a portion of the DC level electrical power is provided to the first AC/DC converter 320, where the direct current is converted into alternating current. The first AC/DC converter 320 can convert the direct current so that the resultant alternating current has a synchronized voltage level, frequency, and phase with respect to the first AC bus 314. The alternating current is directed to the first AC bus 314 from the first AC/DC converter 320 and then directed to the first electric machine 310 to ultimately drive the first spool 304 and/or other electrical loads.

In some embodiments, the second AC/DC converter 350 is rated to handle the power demand requirements of the electric loads 360, 366 associated with the second electrical channel 342 and the power demands of the first electric machine 310. Accordingly, electrical power need only be directed through the AC electrical power system 300 as described above. However, in some embodiments, the second AC/DC converter 350 may not be rated to handle the power demand requirements of the electric loads 360, 366 associated with the second electrical channel 342 and the power demands of the first electric machine 310 at once. To meet the power demand requirements, electrical power can be directed along one or more of the secondary lines 368, 370 so that one or more of the first and second load AC/DC converters 358, 364 can assist second AC/DC converter 350 with converting the AC level electrical power into DC level electrical power before being transferred across the DC bus link 380. Such an example is provided below.

Figure 10:
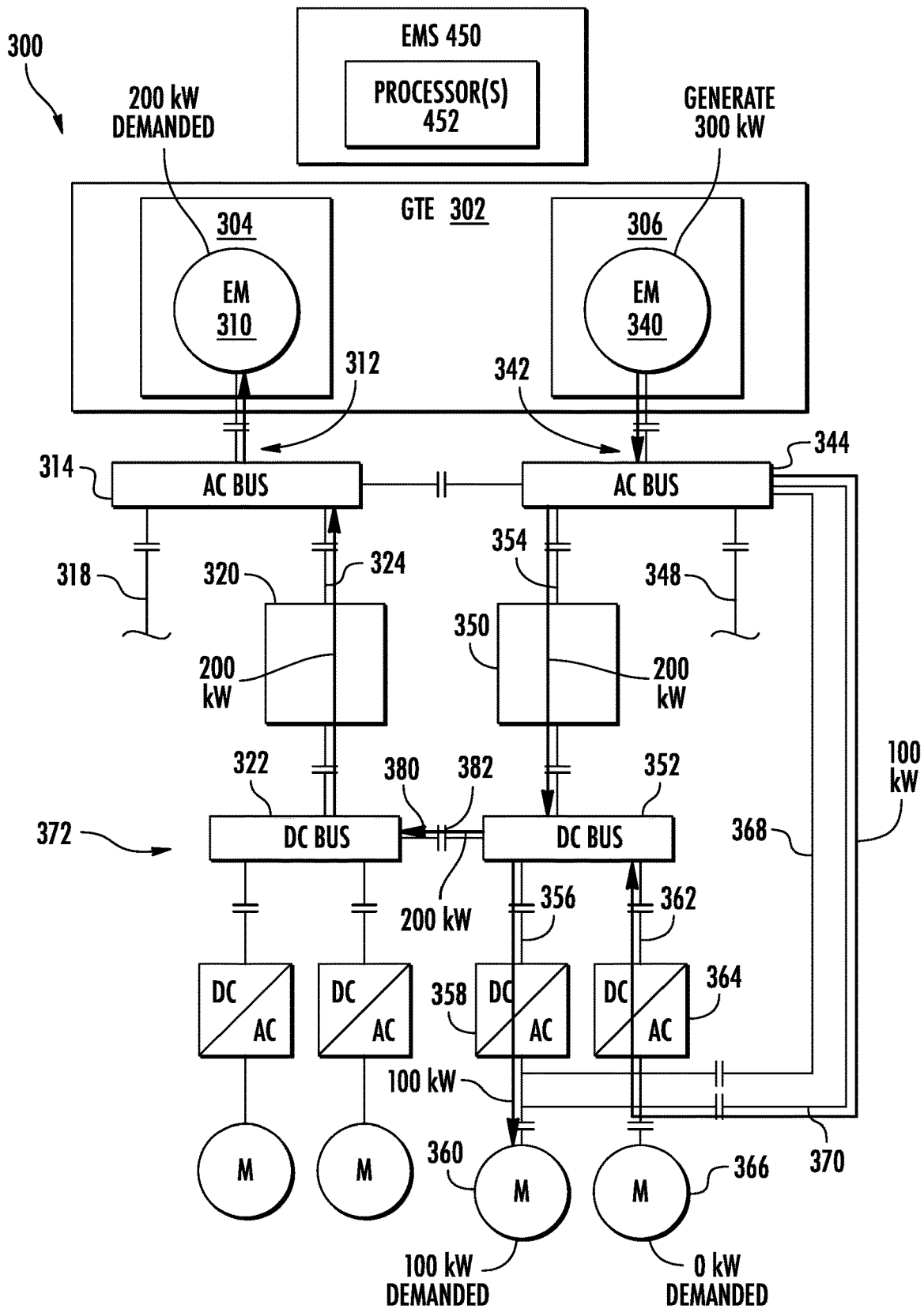
FIG. 10 is a schematic diagram of the AC electrical system of FIG. 5 and depicts an example manner in which electrical power can be distributed through the AC electrical system according to one example embodiment of the present disclosure.

FIG. 10 is a schematic diagram of the AC electrical system 300 of FIG. 5 and depicts an example manner in which electrical power can be distributed through the AC electrical system 300 according to one example embodiment of the present disclosure. As depicted, for this example embodiment, the second electric machine 340 is operable to generate 300 kW, the second AC/DC converter 350 is rated for 200 kW, the electrical load 360 is loading at 100 kW (i.e., the electrical load 360 is demanding 100 kW), the electrical load 366 is not loading (i.e., the electrical load 366 is demanding 0 kW), and the first electric machine 310 is demanding 200 kW. These numbers are provided for example purposes only.

Accordingly, for this example embodiment, 100 kW of the 300 kW of electrical power generated by the second electric machine 340 is to be provided to the electrical load 360 and 200 kW of the 300 kW of electrical power generated by the second electric machine 340 is to be provided to the first electric machine 310. However, as noted above, the second AC/DC converter 350 is rated only for 200 kW, and consequently, not all 300 kW can pass through the second AC/DC converter 350. Thus, for this example, the one or more processors 452 can control the system 300 so that 200 kW of electrical power is directed through the second AC/DC converter 350 and so that 100 kW of electrical power is directed from the second AC bus 344 along the second secondary line 370 as shown in FIG. 10.

The 200 kW of electrical power directed through the second AC/DC converter 350 can be converted to DC level electrical power and routed to the second DC bus 352 of the DC bus system 372. 100 kW of the electrical power directed through the second AC/DC converter 350 and passed through the second DC bus 352 can be directed along the first load line 356 to the first load AC/DC converter 358. The first load AC/DC converter 358 can convert the direct current to alternating current, and the alternating current can be directed to the electrical load 360 to meet its demanded power. The other 100 kW of the electrical power directed through the second AC/DC converter 350 can be transferred across the DC bus link 380 from the second electrical channel 342 to the first electrical channel 312, and along the first electrical channel 312 to the first electric machine 310.

To ensure that the first electric machine 310 receives its 200 kW of demanded power, 100 kW of electrical power is directed from the second AC bus 344 along the second secondary line 370 to the second load line 362. As the electrical load 366 is not loading or demanding electrical power, the second load line 362 is available for use to supplement the electrical power provided to the first electric machine 310. The 100 kW of electrical power directed from the second AC bus 344 along the second secondary line 370 to the second load line 362 is directed through the second load AC/DC converter 364 to convert the alternating current to direct current. The DC level electrical power is directed onward to the DC bus system 372. Then, as noted, the direct current can be transferred across the DC bus link 380 from the second electrical channel 342 to the first electrical channel 312, and along the first electrical channel 312 to the first electric machine 310. In this manner, the second load AC/DC converter 364 assists the second AC/DC converter 350 in converting electrical power to direct current to be transferred across the DC bus link 380. Accordingly, 200 kW of electrical power can be transferred from the second electrical channel 342 to the first electrical channel 312 and ultimately to the first electric machine 310.

In some alternative embodiments, the 200 kW of electrical power directed through the second AC/DC converter 350 can be converted to DC level electrical power and routed to the second DC bus 352 of the DC bus system 372. In such embodiments, all 200 kW of the electrical power directed through the second AC/DC converter 350 can be transferred across the DC bus link 380 from the second electrical channel 342 to the first electrical channel 312, and along the first electrical channel 312 to the first electric machine 310. To satisfy the 100 kW power demand of the electrical load 360, 100 kW of electrical power can be directed from the second AC bus 344 along the first secondary line 368 to the first load line 356 and can be provided to the electrical load 360 to meet its power demand. Accordingly, 200 kW of electrical power can be transferred from the second electrical channel 342 to the first electrical channel 312 and ultimately to the first electric machine 310 to meet its demanded power while still meeting the 100 kW power demand of the electrical load 360.

As noted above, DC level electrical power can be transferred from the second electrical channel 342 to the first electrical channel 312 across the DC bus link 380 for power sharing operations. Notably, in addition or alternatively to transferring DC level electrical power across the DC bus link 380, DC level electrical power can be transferred from the second electrical channel 342 to the first electrical channel 312 across single DC bus 374 as depicted in FIG. 6 and/or across the converter link 390 as depicted in FIG. 7. Power transfer across such connection links can be implemented in addition to or alternatively to power transfer across the DC bus link 380. For instance, in the example above with respect to FIG. 10, electrical power can be transferred from the second electrical channel 342 to the first electrical channel 312 across the single DC bus 374 of FIG. 6 and/or the converter link 390 of FIG. 7 in addition or alternatively to the DC bus link 380 of FIG. 5.

Further, in addition or alternatively to the DC level electrical power transfer across the DC bus link 380 of FIG. 5, the single DC bus 374 of FIG. 6, and/or the converter link 390 of FIG. 7, electrical power can be transferred from the second electrical channel 342 to the first electrical channel 312 across the AC converter link 400 as depicted in FIG. 8.

For instance, with respect to the example of FIG. 10 and with reference to FIGS. 7 and 8, 200 kW of electrical power can be directed through the second AC/DC converter 350 as noted and 100 kW can be directed to the electrical load 360 and 100 kW can be directed across the DC bus link 380 to the first electrical channel 312 and ultimately to the first electric machine 310. To meet the remaining 100 kW of the total 200 kW demanded, 100 kW of electrical power can be directed along the AC converter link 400. The AC level electrical power can be converted by the AC/AC converter 402 so as to have a synchronized voltage level, frequency, and phase to that of the first AC bus 314. The converted AC level electrical power can be provided to the first AC bus 314 and ultimately to the first electric machine 310. In this way, the 200 kW of electrical power demanded by the first electric machine 310 can be received. In some alternative embodiments, the 200 kW of demanded electrical power can be passed through the AC converter link 400, while the 100 kW demanded by the electrical load 360 can be routed to the electrical load 360 via the first secondary line 368 and the first load line 356, for example.

Figure 11:
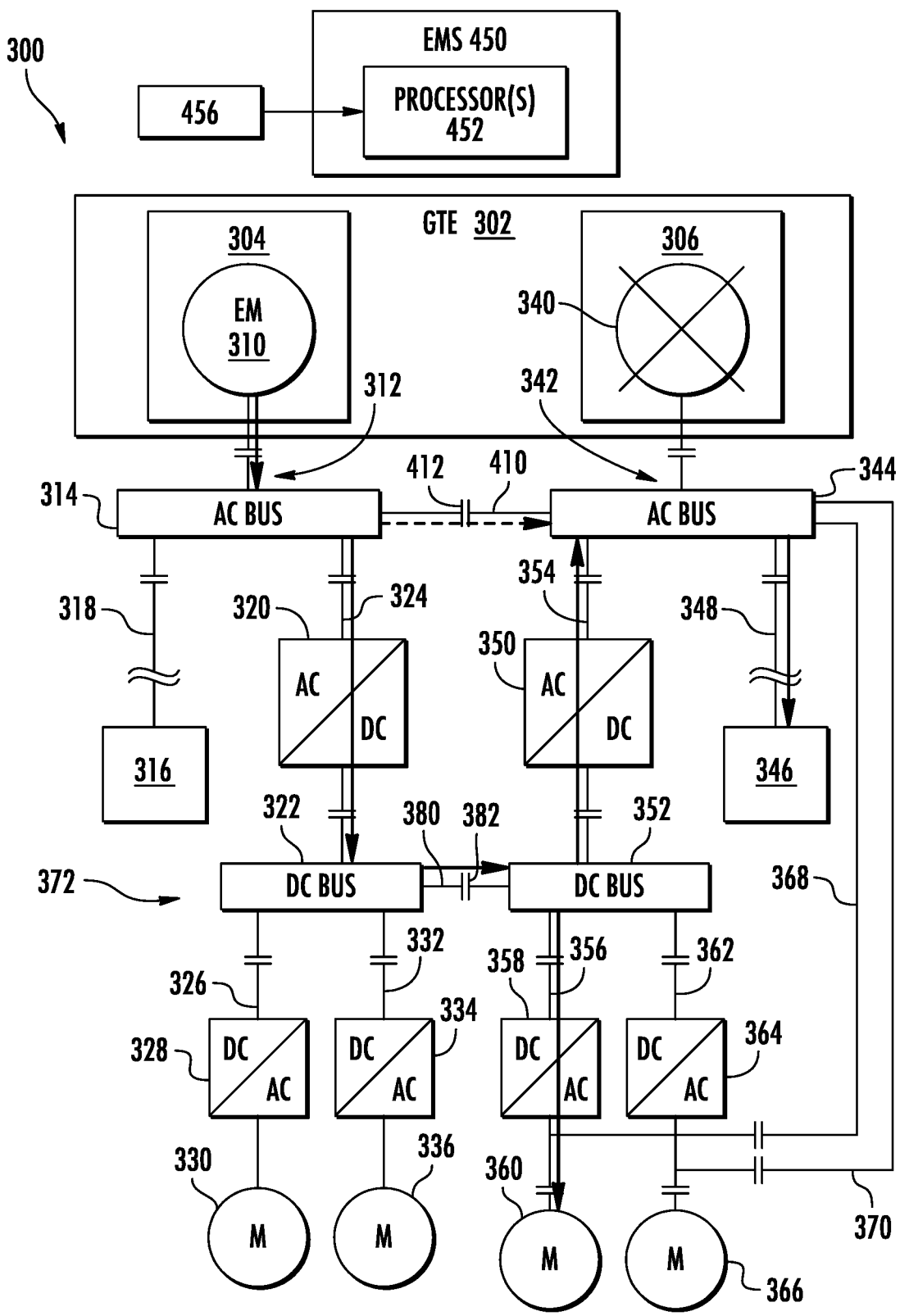
FIG. 11 is a schematic diagram of an AC electrical system for a vehicle according to one example embodiment of the present disclosure and depicts an example manner in which electrical power can be transferred through the system in response to a detected generation failure.

FIG. 11 is a schematic diagram of an AC electrical system 300 for a vehicle according to one example embodiment of the present disclosure and depicts an example manner in which electrical power can be transferred through the system 300 in response to a detected generation failure.

In some example embodiments, the first electric machine 310 mechanically coupled with the first spool 304 of the gas turbine engine 302 can generate electrical power, e.g., so that the generated electrical power can be provided to one or more associated electrical loads 316, 330, 336. Moreover, the second electric machine 340 mechanically coupled with the second spool 306 of the gas turbine engine 302 can generate electrical power, e.g., so that the generated electrical power can be provided to one or more associated electrical loads 346, 360, 366. In such embodiments, the one or more processors 452 can receive data 456 indicating that a generation failure associated with one of the electric machines has occurred. For instance, in the depicted embodiment of FIG. 11, the data 456 indicates that a generation failure associated with the second electric machine 340 has occurred (denoted by the "X" over the second electric machine 340). The generation failure can indicate that the second electric machine 340 is not meeting the power demands of at least one electrical load associated therewith. In some embodiments, the generation failure can indicate that the second electric machine 340 is not meeting the power demands of any of the electrical loads associated therewith.

In response to the detected generation failure associated with the second electric machine 340, electrical power generated by the first electric machine 310 can be transferred across one or more connection links from the first electrical channel 312 associated with the first electric machine 310 to the second electrical channel 342 associated with the second electric machine 340. For instance, in response to the detected generation failure, the one or more processors 452 can control various elements of the system 300 to direct electrical power generated by the first electric machine 310 along the first electrical channel 312 to the first AC bus 314, through the first AC/DC converter 320 wherein the AC level electrical power is converted into DC level electrical power, and across the DC bus system 372 to the second electrical channel 342 as depicted in FIG. 11.

A portion of the DC level electrical power transferred to the second electrical channel 342 can be directed to one or more of the electrical loads 360, 366 along their respective first and second load lines 356, 362, wherein the DC level electrical power is converted by the respective first and second load AC/DC converters 358, 364 so that AC level electrical power is provided to the electrical loads 360, 366. Another portion of the DC level electrical power that has been transferred across the DC bus system 372 can be directed to the one or more electrical loads 346. Particularly, DC level electrical power can be directed through the second AC/DC converter 350, wherein the DC level electrical power is converted into AC level electrical power. The AC level electrical power is then routed to the second AC bus 344. The AC level electrical power can then be directed to the one or more electrical loads 346 along load line 348. In this way, electrical power generated by the first electric machine 310 can be transferred to the second electrical channel 342 and used to satisfy the electrical power demands of the electrical loads 346, 360, 366.

In some embodiments, as shown in FIG. 11, the DC bus system 372 includes first DC bus 322 positioned along the first electrical channel 312 and second DC bus 352 positioned along the second electrical channel 342. In such embodiments, the one or more connection links include DC bus link 380.

Accordingly, in such embodiments, transferring electrical power generated by the first electric machine 310 across the one or more connection links from the first electrical channel 312 associated with the first electric machine 310 to the second electrical channel 342 associated with the second electric machine 340 includes directing electrical power at a DC level across the DC bus link 380 from the first DC bus 322 to the second DC bus 352 and then to one or more AC/DC converters 350, 358, 364 of the second electrical channel 342 and ultimately to the one or more electrical loads 346, 360, 366.

Figure 12:
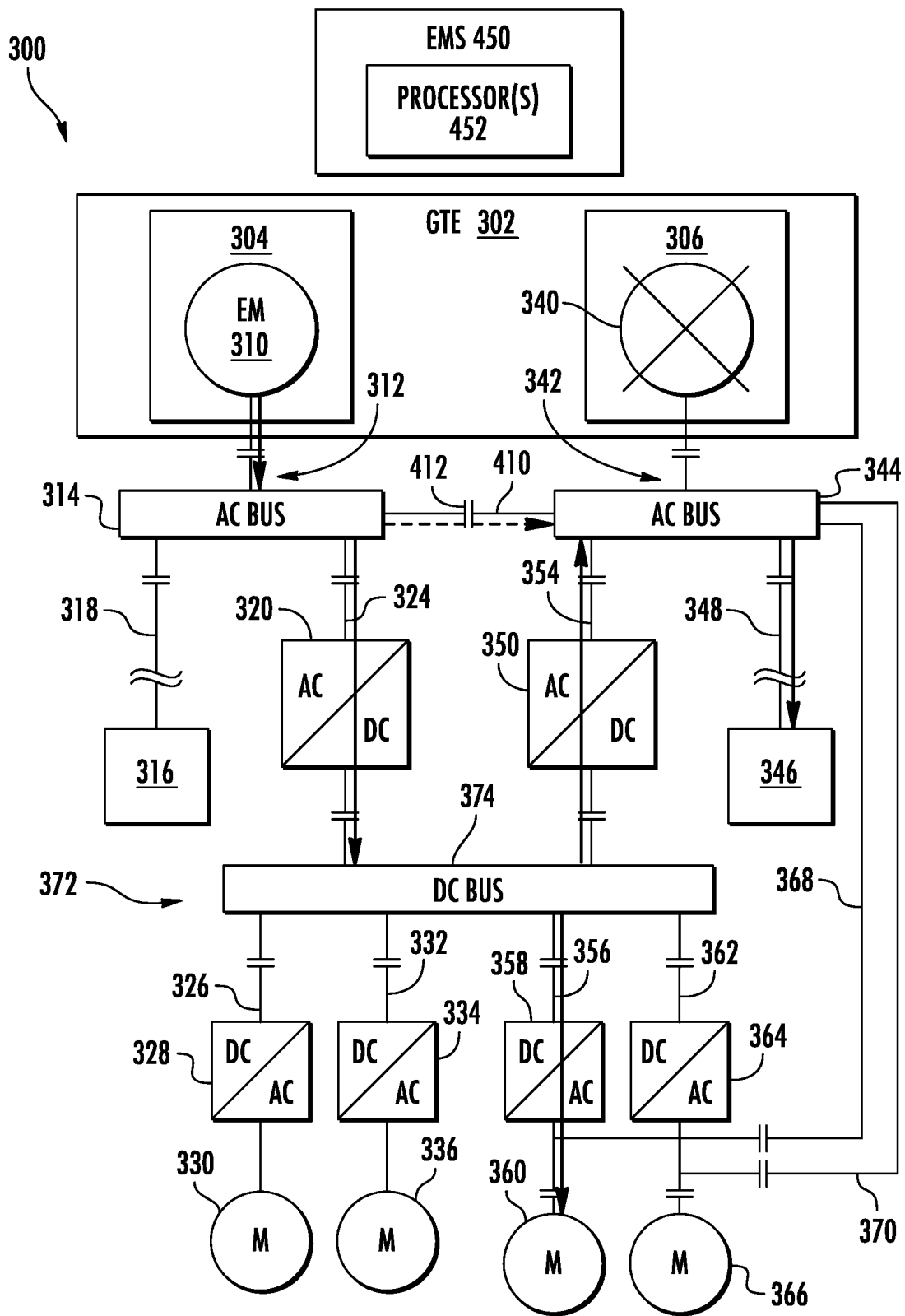
FIG. 12 is a schematic diagram of an AC electrical system for a vehicle according to a further example embodiment of the present disclosure and depicts an example manner in which electrical power can be transferred through the system in response to a detected generation failure.

In some alternative embodiments, as depicted in FIG. 12, the DC bus system 372 includes single DC bus 374 connected to the first electrical channel 312 and the second electrical channel 342. In such embodiments, the one or more connection links include the single DC bus 374. That is, the single DC bus 374 is the connection link between the channels. Accordingly, in such embodiments, transferring electrical power generated by the first electric machine 310 across the one or more connection links from the first electrical channel 312 associated with the first electric machine 310 to the second electrical channel 342 associated with the second electric machine 340 includes directing electrical power at a DC level across the single DC bus 374 and then to one or more AC/DC converters 350, 358, 364 of the second electrical channel 342 and ultimately to the one or more electrical loads 346, 360, 366.

Figure 13:
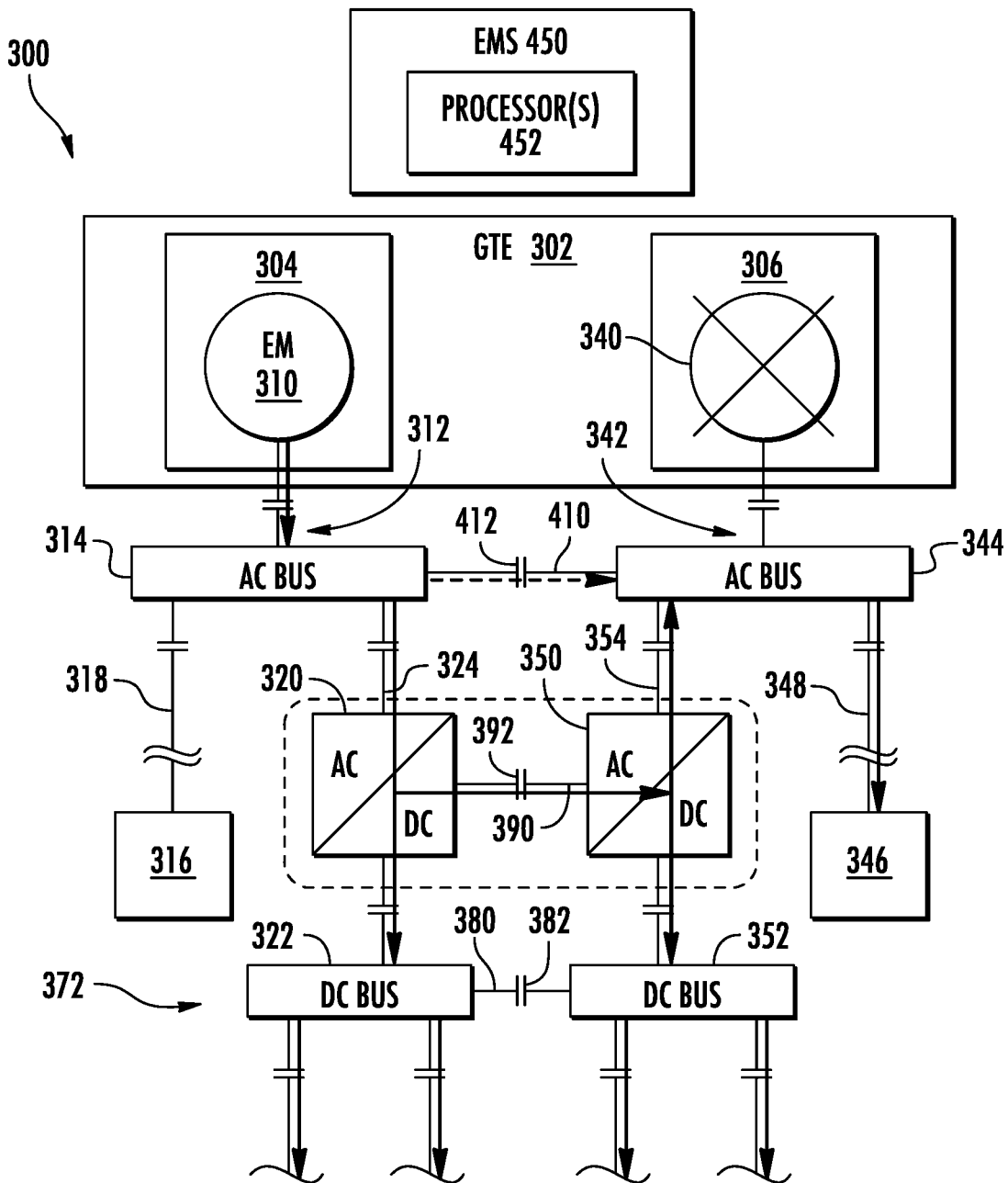
FIG. 13 is a schematic diagram of an AC electrical system for a vehicle according to another example embodiment of the present disclosure and depicts an example manner in which electrical power can be transferred through the system in response to a detected generation failure.

In some other embodiments, as depicted in FIG. 13, the one or more connection links can include converter link 390. Accordingly, in such embodiments, transferring electrical power generated by the first electric machine 310 across the one or more connection links from the first electrical channel 312 associated with the first electric machine 310 to the second electrical channel 342 associated with the second electric machine 340 includes directing electrical power across the converter link 390 at a DC level from the first AC/DC converter 320 of the first electrical channel 312 to the second AC/DC converter 350 of the second electrical channel 342. In this way, electrical power can be provided to one or more electrical loads associated with the second electrical channel 342, such as electrical load 346 depicted in FIG. 13.

Figure 14:
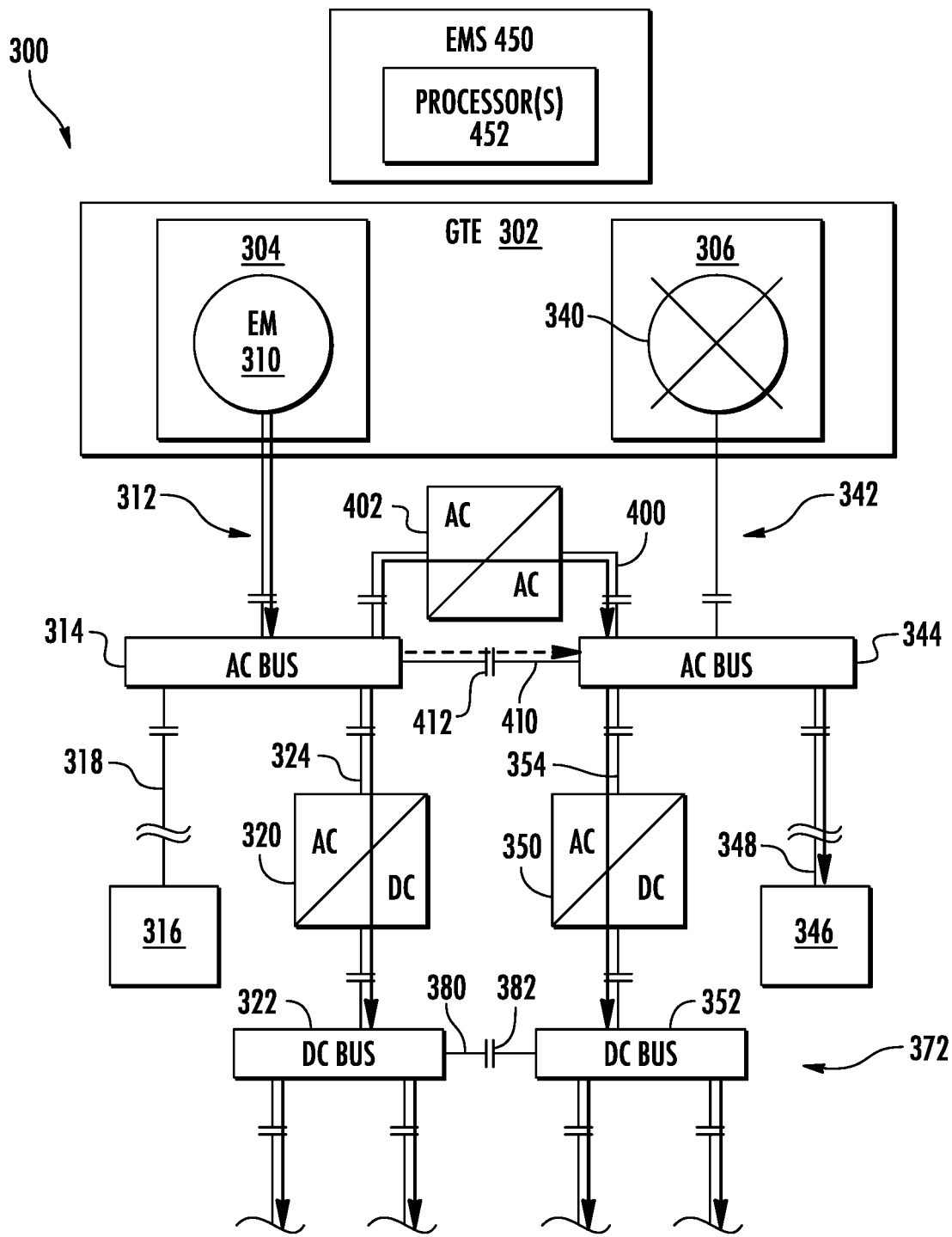
FIG. 14 is a schematic diagram of an AC electrical system for a vehicle according to yet another example embodiment of the present disclosure and depicts an example manner in which electrical power can be transferred through the system in response to a detected generation failure.

In yet other example embodiments, as depicted in FIG. 14, the one or more connection links can include AC converter link 400 having AC/AC converter 402. In such embodiments, transferring electrical power generated by the first electric machine 310 across the one or more connection links from the first electrical channel 312 associated with the first electric machine 310 to the second electrical channel 342 associated with the second electric machine 340 includes directing electrical power at an AC level from the first AC bus 314 of the first electrical channel 312 across the AC converter link 400 through the AC/AC converter 402 to the second AC bus 344 of the second electrical channel 342. In some embodiments, the AC/AC converter 402 is one of a matrix converter and a cycloconverter.

It will be appreciated that the connection links noted above (i.e., the single DC bus 374 of FIG. 12, the converter link 390 of FIG. 13, and the AC converter link 400) can be utilized for electrical power transfer between the first and second electrical channels 312, 342 in addition or alternatively to the DC bus link 380 depicted in FIG. 11 in the event of a detected generation failure.

Returning now to FIG. 11, when a target condition is met, the one or more processors 452 can control the bus tie contactor 412 of the AC bus link 410 to electrically couple the first AC bus 314 of the first electrical channel 312 and the second AC bus 344 of the second electrical channel 342. In this way, electrical power can be transferred at an AC level from the first AC bus 314 directly to the second AC bus 344 and onward to one or more electrical loads 346, 360, 366 associated with the second electrical channel 342. Electrical power being transferred at an AC level from the first AC bus 314 directly to the second AC bus 344 is depicted by the dashed arrow in FIG. 11.

In some embodiments, the target condition is met when electrical power has been transferred across the one or more connection links for a predetermined time. By waiting the time period associated with the predetermined time before electrically coupling the first AC bus 314 with the second AC bus 344 via the AC bus link 410, the electrical power transferred from the first electrical channel 312 to the second electrical channel 342 via the one or more other connection links allows the voltage level, frequency, and phase of the two channels 312, 342 to synchronize. Stated another way, providing the electrical power through the one or more other connection links first before directly coupling the first and second AC buses 314, 344 allows the voltage level and frequency of the second AC bus 344 to be synchronized to the voltage level and frequency of the first AC bus 314 before the first and second AC buses 314, 344 are directly electrically coupled by the AC bus link 410. This also allows the first AC bus 314 and the second AC bus 344 to synchronize in phase.

In yet other embodiments, the target condition is met when a voltage level of the first AC bus 314 and a voltage level of the second AC bus 344 are within a predetermined range of one another, e.g., within five percent of one another. In some further embodiments, the target condition is met when a frequency of the first AC bus 314 and a frequency of the second AC bus 344 are within a predetermined range of one another. One or more sensors at the first and second AC buses 314, 344 can measure such characteristics and sensor readings can be provided to the one or more processors 452 so that the one or more processors 452 can determine when the target condition is met.

When the target condition is met, electrical power can be transferred across the AC bus link 410 as noted above, e.g., as shown by the dashed arrow in FIG. 11. This allows direct transfer of electrical power at the AC level from the first AC bus 314 to the second AC bus 344. In this way, the transfer and distribution of electrical power through the system 300 can be achieved efficiently. In some embodiments, when the target condition is met, electrical power can be prevented from being transferred to the second electrical channel 342 through all other connection links besides the AC bus link 410. In other embodiments, when the target condition is met, electrical power can continue to be transferred to the second electrical channel 342 through one or more connection links besides the AC bus link 410.

It will be appreciated that the propulsion system 50 and AC electrical system 300 described above and depicted in the accompanying figures are provided by way of example only and that in other exemplary embodiments, the propulsion system 50 and AC electrical system 300 may have other suitable configurations. In certain exemplary embodiments, such as the example embodiment depicted in FIG. 15, the turbomachine or core turbine engine 104 of the gas turbine engine 100 may include an intermediate speed spool 175 in addition to a high speed spool 160 and a low speed spool 180. With such a configuration, the low speed spool 180 may extend from the low speed turbine 118 directly to the fan 126, the intermediate speed spool 175 may drive a booster compressor 110 (e.g., a low speed compressor) with an intermediate speed turbine 119, and the high speed spool 160 may drive the high speed compressor 112 with the high speed turbine 116.

Figure 15:
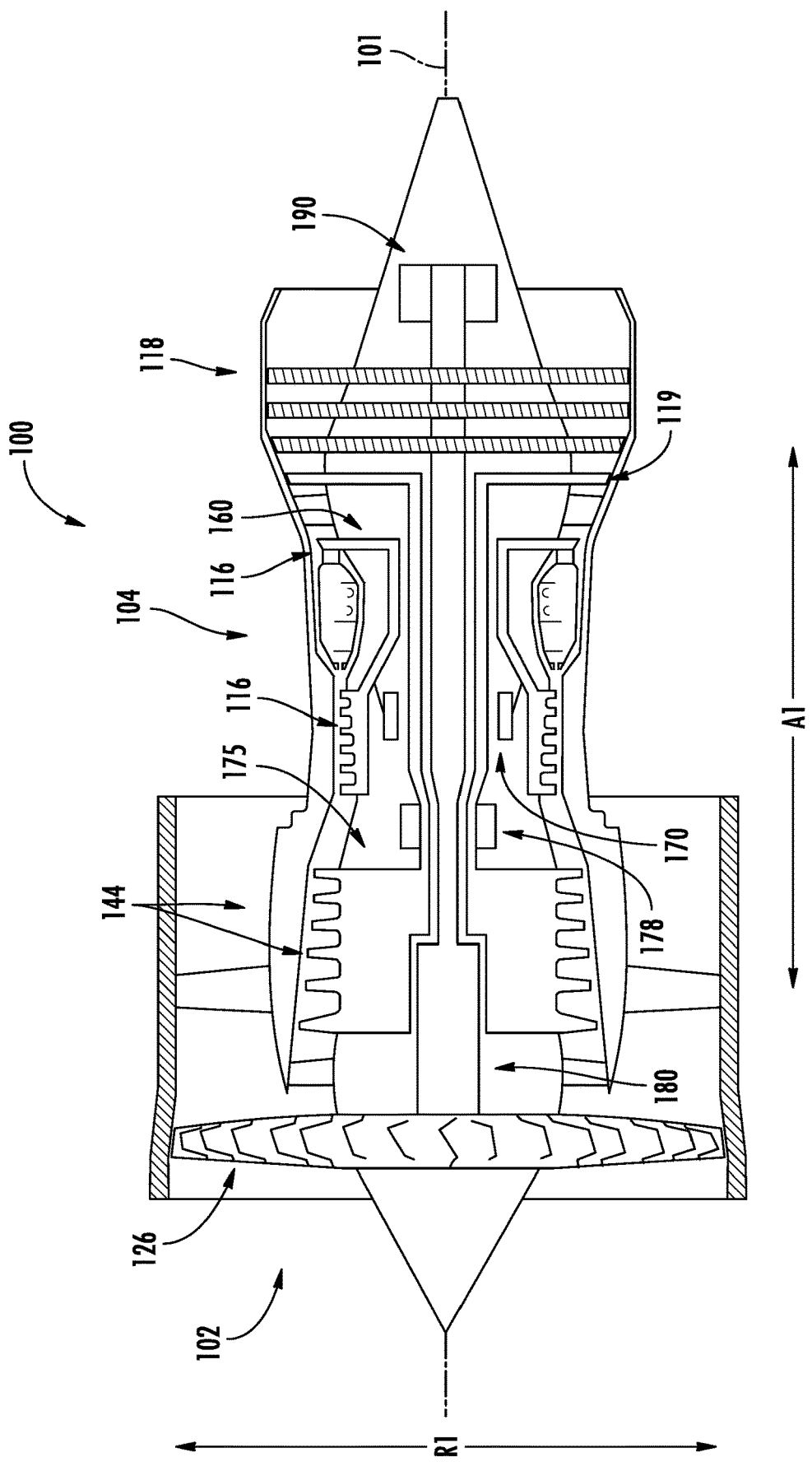
FIG. 15 is a schematic cross-sectional view of a three-spool gas turbine engine according one example embodiment of the present disclosure.

Further, it will be appreciated that when a gas turbine engine includes three spools, such as is depicted in FIG. 15, the AC electrical system may further include a third electric machine 178 mechanically coupled with the third spool 175 of the gas turbine engine 100 (e.g., an intermediate speed spool). A third electrical channel may electrically couple the third electric machine 178 to a third AC bus. Further, with such a configuration, the AC electrical system may further include one or more connection links selectively electrically coupling the third electrical channel with the first electrical channel, the second electrical channel, or both, e.g., in any of the example manners described herein. In this regard, electrical power generated by the third electric machine 178 is transferrable to the first electrical channel, the second electrical channel, or both, and further, electrical power generated by the first electric machine 170 is transferrable to the second electrical channel, the third electrical channel, or both, and in addition, electrical power generated by the second electric machine 190 is transferrable to the first electrical channel, the third electrical channel, or both.

Figure 16:
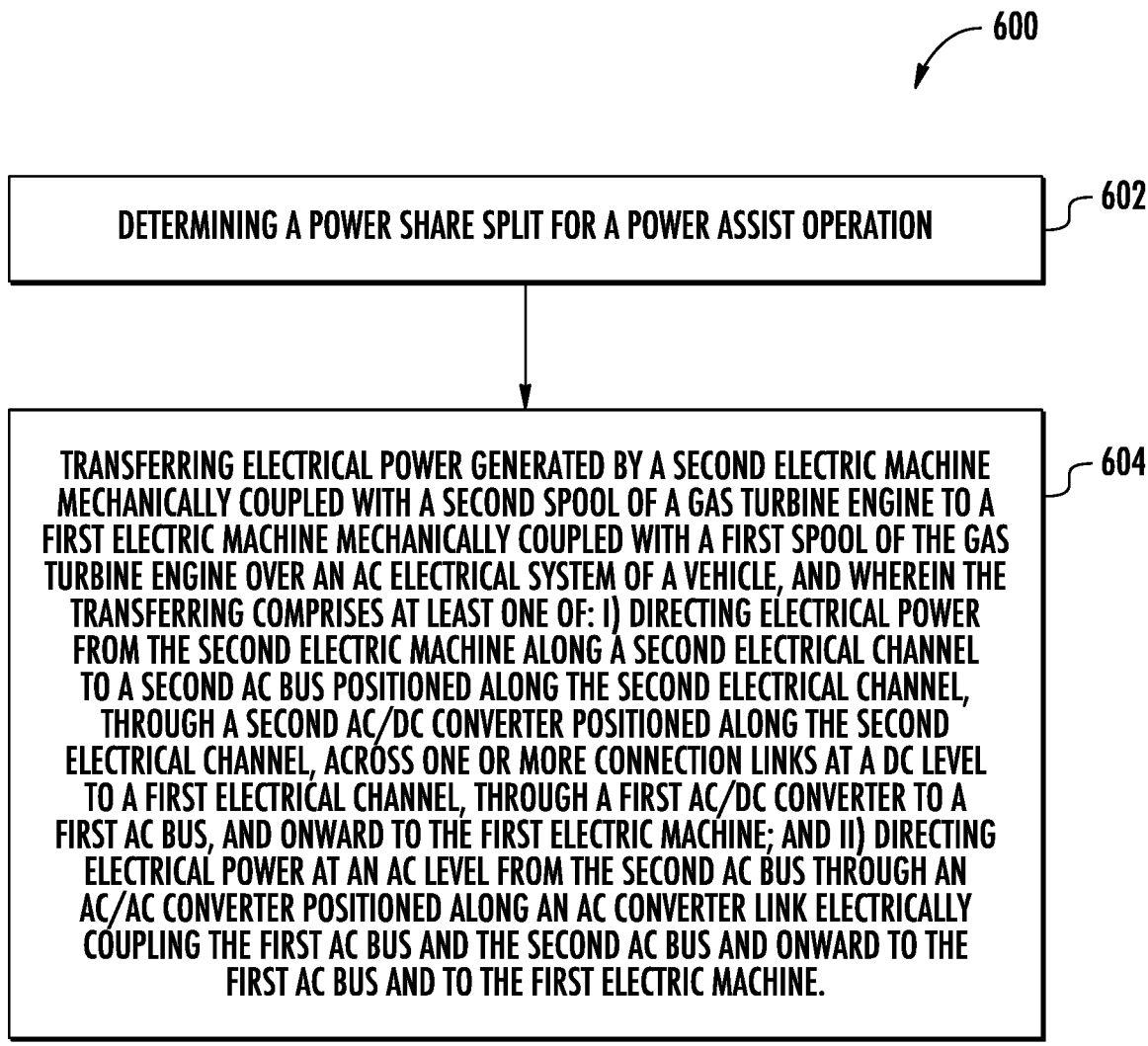
FIG. 16 is a flow diagram for a method of transferring power between spools of a gas turbine engine according to one aspect of the present disclosure.

FIG. 16 provides a flow diagram for a method 600 of transferring power between spools of a gas turbine engine for a power assist operation according to one aspect of the present disclosure. FIG. 16 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At 602, the method 600 includes determining a power share split for a power assist operation. For instance, one or more processors of an EMS can initiate a power assist operation based at least in part on received data. The data can indicate a demanded thrust output of the gas turbine engine as well as the electrical power demanded by the electrical loads of the gas turbine engine and vehicle. The power share split can indicate whether and how much electrical power is to be drawn from or provided to the first electric machine and whether and how much electrical power is to be drawn from or provided to the second electric machine.

At 604, with reference again to FIG. 16, the method 600 includes transferring electrical power generated by a second electric machine mechanically coupled with a second spool of a gas turbine engine to a first electric machine mechanically coupled with a first spool of the gas turbine engine over an AC electrical system of a vehicle. For instance, the vehicle can be an aircraft. In some implementations, transferring the electrical power at 604 includes at least one: i) directing electrical power from the second electric machine along a second electrical channel to a second AC bus positioned along the second electrical channel, through a second AC/DC converter positioned along the second electrical channel, across one or more connection links at a DC level to a first electrical channel, through a first AC/DC converter to a first AC bus, and onward to the first electric machine; and ii) directing electrical power at an AC level from the second AC bus through an AC/AC converter positioned along an AC converter link electrically coupling the first AC bus and the second AC bus and onward to the first AC bus and to the first electric machine.

In yet other implementations, the AC electrical system has a DC bus system that includes a first DC bus positioned along the first electrical channel and a second DC bus positioned along the second electrical channel. In such implementations, the one or more connection links include a DC bus link, e.g., as shown in FIG. 5. Further, in such implementations, transferring the electrical power from the second electric machine to the first electric machine includes directing electrical power at the DC level across the DC bus link from the second DC bus to the first DC bus and then to the first AC/DC converter, e.g., to be converted back to alternating current before being directed to the first AC bus and ultimately to the first electric machine.

In some further implementations, the AC electrical system has a DC bus system that includes a single DC bus connected to the first electrical channel and the second electrical channel. In such implementations, the one or more connection links include the single DC bus, e.g., as shown in FIG. 6, and wherein transferring the electrical power includes directing electrical power at the DC level across the single DC bus.

In some implementations, the one or more connection links include a converter link, e.g., as shown in FIG. 7. In such implementations, the transferring includes directing electrical power across the converter link at the DC level from the second AC/DC converter to the first AC/DC converter.

In other implementations, transferring electrical power from the second electric machine to the first electric machine includes directing electrical power at an AC level from the second AC bus through an AC/AC converter positioned along an AC converter link electrically coupling the first AC bus and the second AC bus, e.g., as shown in FIG. 8, and onward to the first AC bus and to the first electric machine. In some implementations, the AC/AC converter is one of a matrix converter and a cycloconverter.

In some further implementations, transferring electrical power from the second electric machine to the first electric machine includes directing electrical power at a DC level and at an AC level across multiple connection links, e.g., as shown in FIG. 9.

Moreover, in other implementations, the second electrical channel has a load line that electrically couples a load AC/DC converter to a DC bus system and the load AC/DC converter to an electrical load. The second electrical channel has a secondary line that electrically connects the second AC bus with the load line at a point between the load AC/DC converter and the electrical load. In such implementations, transferring electrical power generated by the second electric machine to the first electric machine includes directing electrical power along the secondary line, through the load AC/DC converter and to the DC bus system, across the at least one of the one or more connection links from the second electrical channel to the first electrical channel, and along the first electrical channel to the first electric machine.

Figure 17:
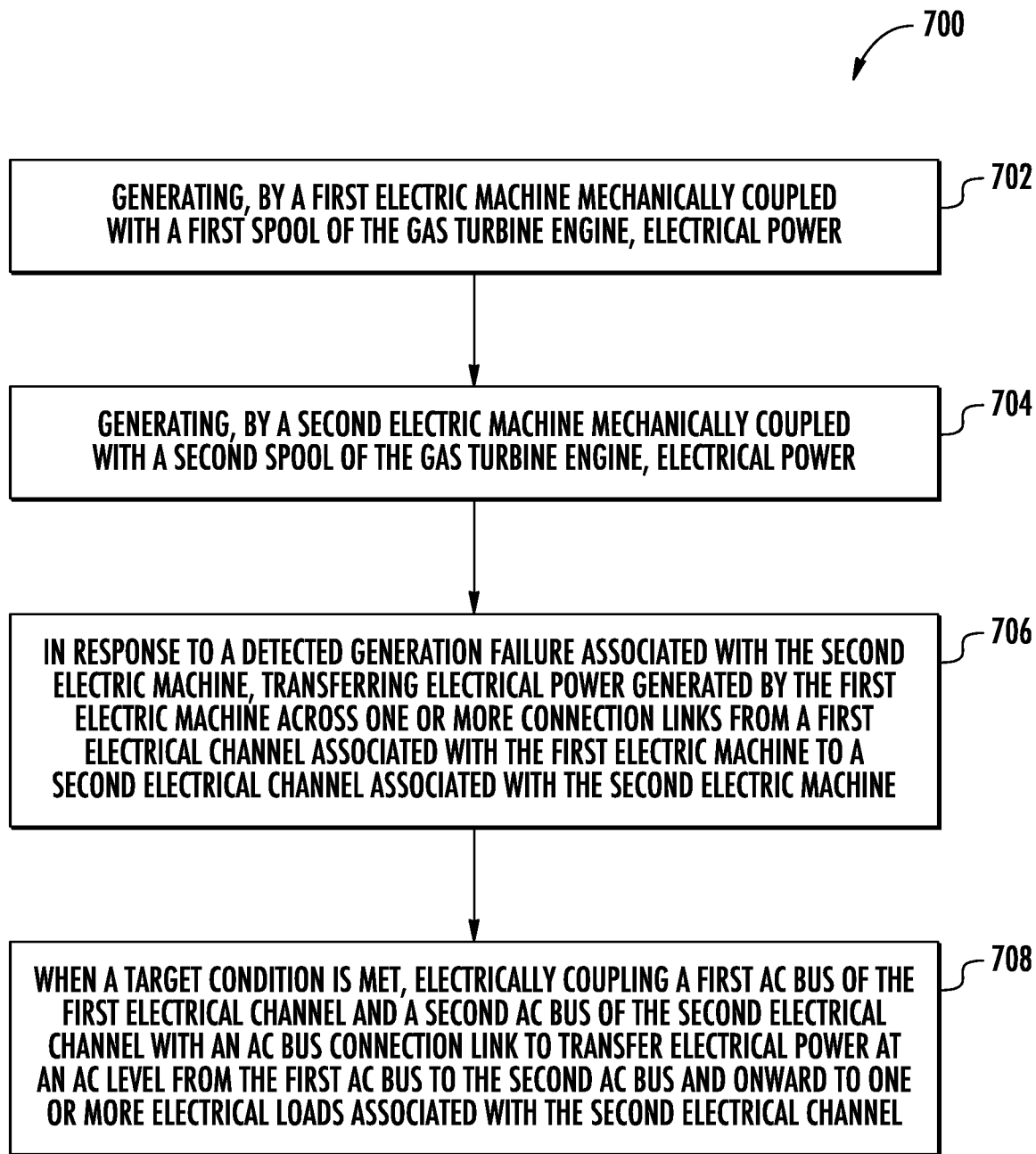
FIG. 17 is a flow diagram for a method of transferring power between spools of a gas turbine engine according to one aspect of the present disclosure.

FIG. 17 provides a flow diagram for a method 700 of transferring electrical power through an AC electrical system of a vehicle according to one aspect of the present disclosure. FIG. 17 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At 702, the method 700 includes generating, by a first electric machine mechanically coupled with a first spool of a gas turbine engine, electrical power. The gas turbine engine can be a multi-spool gas turbine engine for an aircraft, for example. In some implementations, the gas turbine engine can be a two-spool gas turbine engine having the first spool and a second spool. In yet other implementations, the gas turbine engine can include more than two spools.

At 704, the method 700 includes generating, by a second electric machine mechanically coupled with a second spool of the gas turbine engine, electrical power. In this regard, the first electric machine is generated electrical power at 702 and the second electric machine is generating electrical power at 704. The electrical power generated by the first and second electric machines can be directed to their respective electrical loads, for example.

At 706, the method 700 includes, in response to a detected generation failure associated with the second electric machine, transferring electrical power generated by the first electric machine across one or more connection links from a first electrical channel associated with the first electric machine to a second electrical channel associated with the second electric machine. For instance, one or more processors can receive data indicating that a generation failure associated with the second electric machine has occurred.

The generation failure can indicate that the second electric machine is not meeting the power demands of at least one electrical load associated therewith. Accordingly, to ensure the power demands of the at least one electrical load associated with the second electric machine are met, electrical power generated by the first electric machine can be transferred from the first electrical channel to the second electrical channel across the one or more connection links, such as any of the connection links disclosed herein.

For instance, in some implementations, the AC electrical system has a DC bus system that includes a first DC bus positioned along the first electrical channel and a second DC bus positioned along the second electrical channel. In such implementations, the one or more connection links include a DC bus link, e.g., as shown in FIG. 11. Accordingly, transferring electrical power generated by the first electric machine across the one or more connection links from the first electrical channel associated with the first electric machine to the second electrical channel associated with the second electric machine includes directing electrical power at a DC level across the DC bus link from the first DC bus to the second DC bus and then to one or more AC/DC converters of the second electrical channel.

In some further implementations, the AC electrical system has a DC bus system that includes a single DC bus connected to the first electrical channel and the second electrical channel. The one or more connection links include the single DC bus, e.g., as shown in FIG. 12. In such implementations, transferring electrical power generated by the first electric machine across one or more connection links from the first electrical channel associated with the first electric machine to the second electrical channel associated with the second electric machine includes directing electrical power at a DC level across the single DC bus and then to one or more AC/DC converters of the second electrical channel.

In some implementations, the one or more connection links include a converter link, e.g., as shown in FIG. 13. In such implementations, transferring electrical power at 706 includes directing electrical power across the converter link at a DC level from a first AC/DC converter of the first electrical channel to a second AC/DC converter of the second electrical channel. As noted, the electrical power can be transferred across the converter link at the DC level, or stated differently, as direct current.

In yet other example implementations, the one or more connection links include an AC converter link having an AC/AC converter, e.g., as shown in FIG. 14. In such implementations, transferring electrical power generated by the first electric machine across the one or more connection links from the first electrical channel associated with the first electric machine to the second electrical channel associated with the second electric machine includes directing electrical power at an AC level from the first AC bus of the first electrical channel across the AC converter link and through the AC/AC converter to the second AC bus of the second electrical channel. In some implementations, the AC/AC converter is one of a matrix converter and a cycloconverter.

At 708, the method 700 includes, when a target condition is met, electrically coupling a first AC bus of the first electrical channel and a second AC bus of the second electrical channel with an AC bus link to transfer electrical power at an AC level from the first AC bus to the second AC bus and onward to one or more electrical loads associated with the second electrical channel. In some implementations, the first AC bus and the second AC bus are directly electrically connected. In this way, electrical power can be more efficiently transferred from one electrical channel to the other.

In some implementations, the target condition is met when electrical power has been transferred across the one or more connection links for a predetermined time. In yet other implementations, the target condition is met when a voltage level of the first AC bus and a voltage level of the second AC bus are within a predetermined range of one another, e.g., within five percent of one another. In some further implementations, the target condition is met when a frequency of the first AC bus and a frequency of the second AC bus are within a predetermined range of one another.

Figure 18:
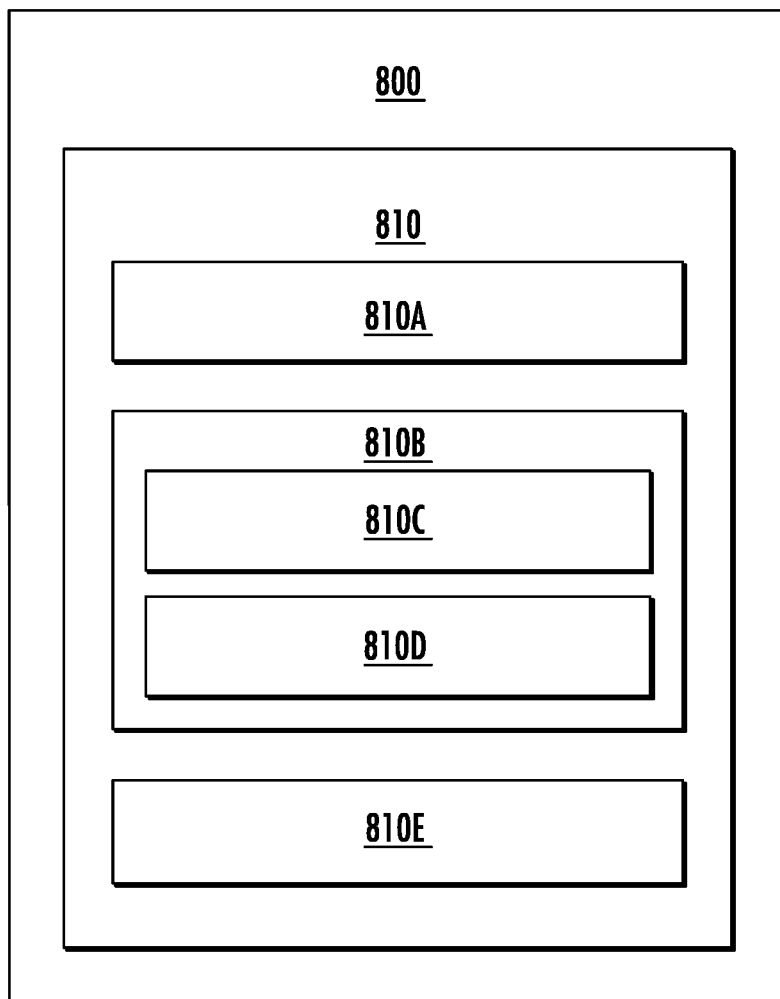
FIG. 18 is a block diagram of an example computing system according to an example aspect of the present disclosure.

FIG. 18 provides an example computing system 800 according to example embodiments of the present disclosure. The computing elements or systems described herein can include one, some, or all the components of computing system 800 and can execute operations as described below.

As shown in FIG. 18, the computing system 800 can include one or more computing device(s) 810. The computing device(s) 810 can include one or more processor(s) 810A and one or more memory device(s) 810B. The one or more processor(s) 810A can include any suitable processing device, such as a microprocessor, microcontroller, integrated circuit, logic device, and/or other suitable processing device. The one or more memory device(s) 810B can include one or more computer-readable media, including, but not limited to, non-transitory computer-readable media, RAM, ROM, hard drives, flash drives, and/or other memory devices.

The one or more memory device(s) 810B can store information accessible by the one or more processor(s) 810A, including computer-executable or computer-readable instructions 810C that can be executed by the one or more processor(s) 810A. The instructions 810C can be any set of instructions that when executed by the one or more processor(s) 810A, cause the one or more processor(s) 810A to perform operations. In some embodiments, the instructions 810C can be executed by the one or more processor(s) 810A to cause the one or more processor(s) 810A to perform operations, such as any of the operations and functions for which the computing system 800 and/or the computing device(s) 810 are configured. The instructions 810C can be software written in any suitable programming language or can be implemented in hardware. Additionally, and/or alternatively, the instructions 810C can be executed in logically and/or virtually separate threads on processor(s) 810A. The memory device(s) 810B can further store data 810D that can be accessed by the processor(s) 810A.

The computing device(s) 810 can also include a network interface 810E used to communicate, for example, with the other components of system 800 (e.g., via a network). The network interface 810E can include any suitable components for interfacing with one or more network(s), including for example, transmitters, receivers, ports, controllers, antennas, and/or other suitable components. One or more controllable devices (e.g., bus tie contactors, power converters, etc.) can be configured to receive one or more commands from the computing device(s) 810 or provide one or more commands to the computing device(s) 810.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

FIGS. 19 through 22 provide various circuit diagrams depicting example manners in which the first AC bus 314 can be electrically coupled with the second AC bus 344.

Figure 19:
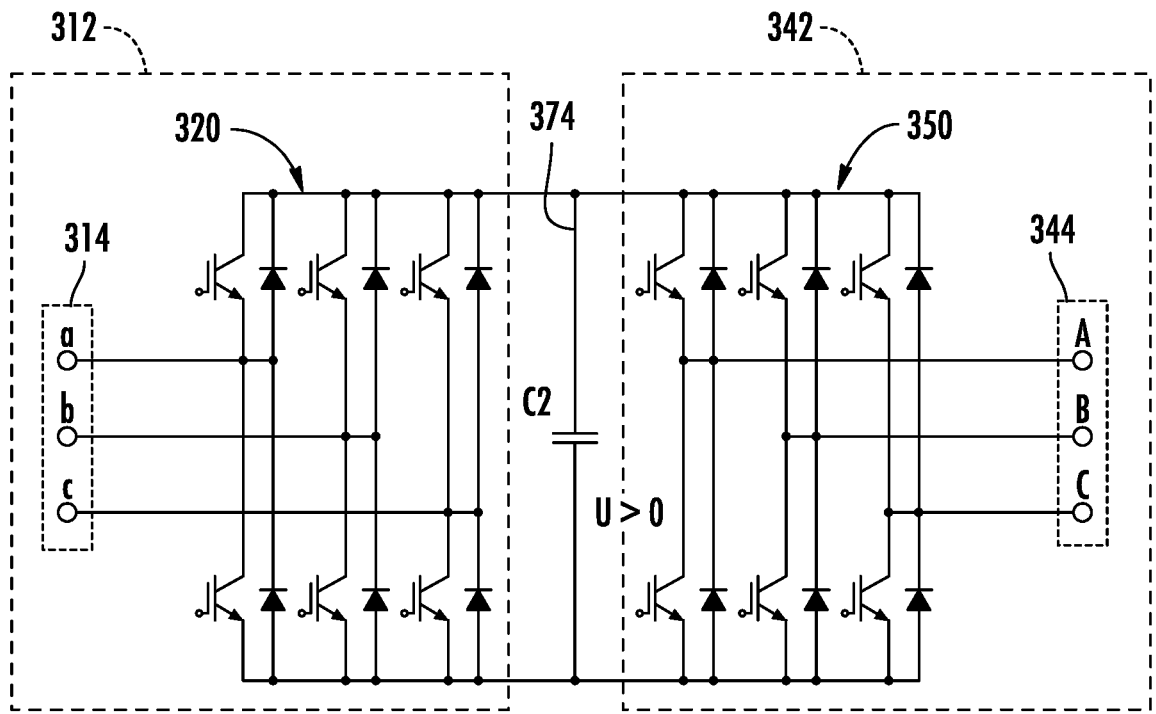
FIGS. 19 through 22 provide various circuit diagrams depicting example manners in which a first AC bus can be electrically coupled with a second AC bus of an AC electrical system for a vehicle.

FIG. 19 depicts a circuit diagram for a voltage-source DC link converter implementation in which the first AC bus 314 of the first electrical channel 312 is electrically coupled with the second AC bus 344 of the second electrical channel 342 via a voltage DC bus. As shown, the first AC bus 314 is electrically connected to the first AC/DC converter 320. That is, lines associated with respective phases a, b, c electrically connect the first AC bus 314 with the different levels or legs of the first AC/DC converter 320. The first AC/DC converter 320 is a multilevel converter having a plurality of diodes and switching elements. The switching elements can be any suitable type of switching elements, such as insulated gate bipolar transistors, power MOSFETs, etc.

The first AC/DC converter 320 is electrically connected to single DC bus 374 (correlating to the single DC bus 374 of FIG. 6). The single DC bus 374 has a capacitor C2 to keep the DC bus voltage constant or nearly constant. The DC bus 374 is electrically connected to the second AC/DC converter 350. Stated another way, lines associated with respective phases A, B, C electrically connect the second AC bus 344 with the different levels or legs of the second AC/DC converter 350. Like the first AC/DC converter 320, the second AC/DC converter 350 is a multilevel converter having a plurality of diodes and switching elements. The switching elements can be any suitable type of switching elements, such as insulated gate bipolar transistors, power MOSFETs, etc. It will be appreciated that the first AC bus 314 can be electrically coupled with the second AC bus 344 via a voltage DC bus as shown in FIG. 19 in other DC bus system embodiments disclosed herein (e.g., embodiments in which the DC bus system includes separate DC buses as shown in FIG. 5 and/or where electrical power is transferred across converter link 390 as shown in FIG. 7).

Figure 20:
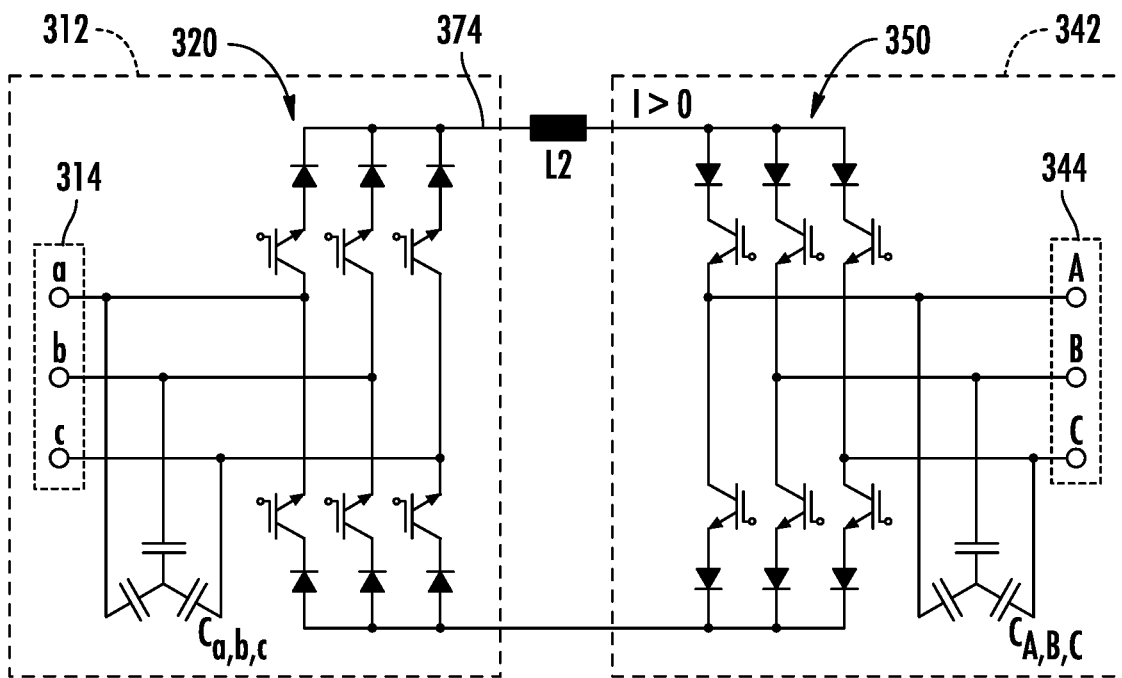

FIG. 20 depicts a circuit diagram for a current-source DC link converter implementation in which the first AC bus 314 of the first electrical channel 312 is electrically coupled with the second AC bus 344 of the second electrical channel 342 via a current DC bus. As shown, the first AC bus 314 is electrically connected to the first AC/DC converter 320. Stated differently, lines associated with respective phases a, b, c electrically connect the first AC bus 314 with the different levels or legs of the first AC/DC converter 320. The first AC/DC converter 320 is a multilevel converter having a plurality of diodes and switching elements. The switching elements can be any suitable type of switching elements, such as insulated gate bipolar transistors, power MOSFETs, etc.

The first AC/DC converter 320 is electrically connected to single DC bus 374 (correlating to the single DC bus 374 of FIG. 6). The single DC bus 374 has an inductor L2 to keep the DC bus electric current constant or nearly constant. The DC bus 374 is electrically connected to the second AC/DC converter 350. Stated another way, lines associated with respective phases A, B, C electrically connect the second AC bus 344 with the different levels or legs of the second AC/DC converter 350. The second AC/DC converter 350 is a multilevel converter having a plurality of diodes and switching elements. The switching elements can be any suitable type of switching elements, such as insulated gate bipolar transistors, power MOSFETs, etc. It will be appreciated that the first AC bus 314 can be electrically coupled with the second AC bus 344 via a current DC bus as shown in FIG. 20 in other DC bus system embodiments disclosed herein (e.g., embodiments in which the DC bus system includes separate DC buses as shown in FIG. 5 and/or where electrical power is transferred across converter link 390 as shown in FIG. 7).

Figure 21:
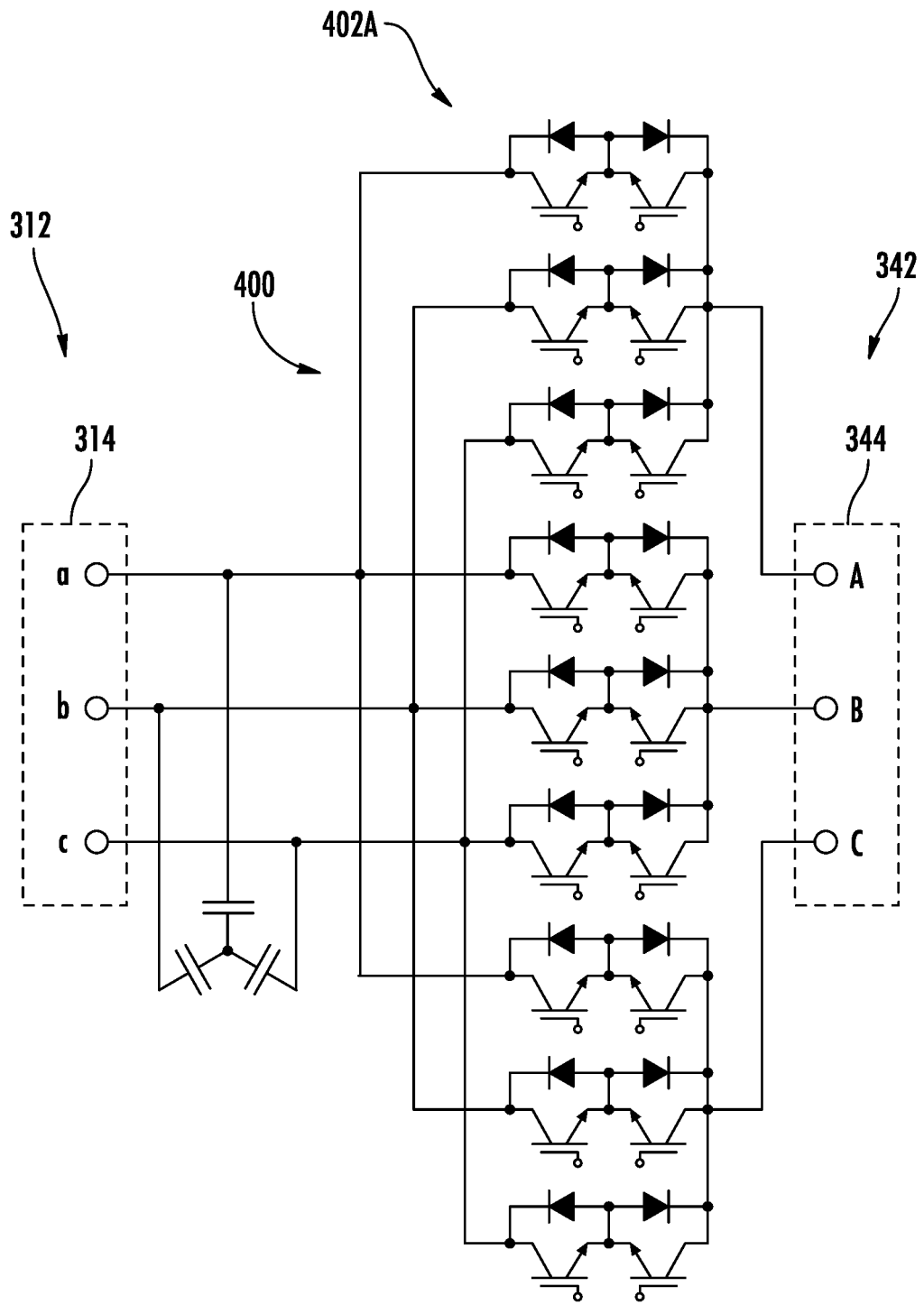

FIG. 21 depicts a circuit diagram for a matrix converter implementation in which the first AC bus 314 of the first electrical channel 312 is electrically coupled with the second AC bus 344 of the second electrical channel 342 via AC converter link 400 with AC/AC matrix converter 402A positioned along the link 400. As shown, the AC/AC matrix converter 402A includes a plurality of switching elements. The switching elements can be any suitable type of switching elements, such as insulated gate bipolar transistors, power MOSFETs, etc. For this embodiment, the AC/AC matrix converter 402A can perform voltage and current conversion in a single stage for the three phases depicted. The AC/AC matrix converter 402A is operable to convert AC level electrical power flowing along the AC converter link 400 to synchronize with the voltage level, frequency, and phase associated with the AC bus to which the AC level electrical power is directed. The AC/AC matrix converter 402A can be implemented as the AC/AC converter 402 for the embodiments of FIGS. 8, 9, 14, among others, for example.

Figure 22:
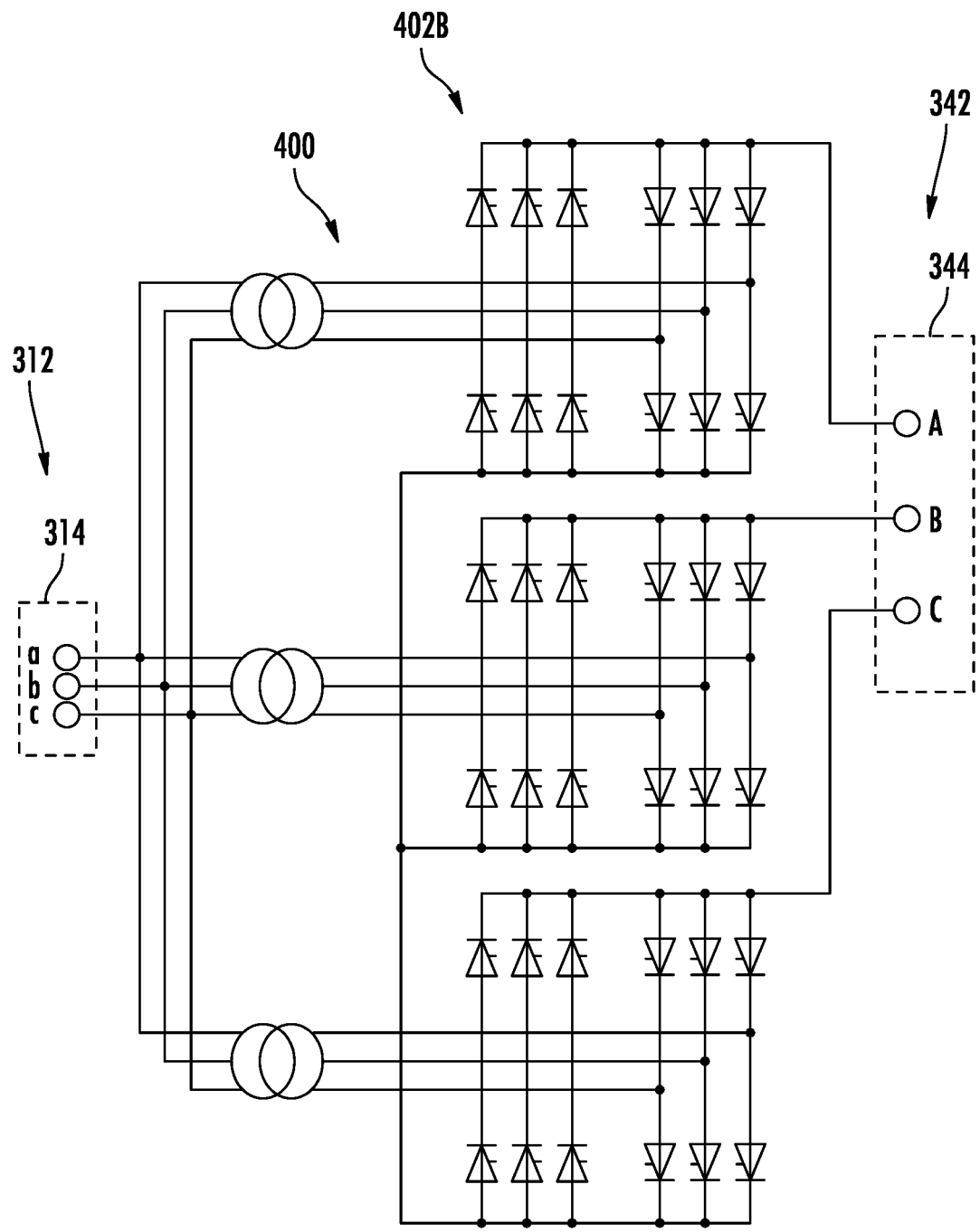

FIG. 22 depicts a circuit diagram for a cycloconverter implementation in which the first AC bus 314 of the first electrical channel 312 is electrically coupled with the second AC bus 344 of the second electrical channel 342 via AC converter link 400 with AC/AC cycloconverter 402B positioned along the link 400. As shown, the AC/AC cycloconverter 402B includes a plurality of phase-controlled switching elements. The phase-controlled switching elements can be any suitable type of switching elements. The AC/AC cycloconverter 402B is operable to convert AC level electrical power flowing along the AC converter link 400 to synchronize with the voltage level, frequency, and phase associated with the AC bus to which the AC level electrical power is directed. The AC/AC cycloconverter 402B can be implemented as the AC/AC converter 402 for the embodiments of FIGS. 8, 9, 14, among others, for example.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. An AC electrical system for a vehicle, comprising: a first electric machine mechanically coupled with a first spool of a gas turbine engine; a second electric machine mechanically coupled with a second spool of the gas turbine engine; a first AC bus; a second AC bus; a first electrical channel electrically coupling the first electric machine to the first AC bus; a second electrical channel electrically coupling the second electric machine to the second AC bus; one or more connection links selectively electrically coupling the first electrical channel and the second electrical channel; and one or more power converters operable to convert electrical power transferred between the first electrical channel and the second electrical channel across the one or more connection links so that electrical power generated by the second electric machine is transferable to the first electrical channel or so that electrical power generated by the first electric machine is transferable to the second electrical channel.

2. The AC electrical system of any preceding clause, further comprising: a DC bus system; a first AC/DC converter, the first AC/DC converter being a bidirectional AC/DC converter; and a second AC/DC converter, and wherein the first electrical channel electrically couples the first AC bus to the first AC/DC converter and the first AC/DC converter to the DC bus system, and wherein the second electrical channel electrically couples the second AC bus to the second AC/DC converter and the second AC/DC converter to the DC bus system.

3. The AC electrical system of any preceding clause, wherein the DC bus system includes a first DC bus positioned along the first electrical channel and a second DC bus positioned along the second electrical channel, and wherein the one or more connection links include a DC bus link for selectively electrically coupling the first DC bus and the second DC bus of the DC bus system.

4. The AC electrical system of any preceding clause, wherein the DC bus system includes a single DC bus, and wherein the one or more connection links include the single DC bus for selectively electrically coupling the first electrical channel and the second electrical channel.

5. The AC electrical system of any preceding clause, wherein the DC bus system is one of a voltage DC bus and a current DC bus.

6. The AC electrical system of any preceding clause, further comprising: a first AC/DC converter; and a second AC/DC converter, and wherein the one or more connection links include a converter link for selectively electrically coupling the first AC/DC converter and the second AC/DC converter.

7. The AC electrical system of any preceding clause, wherein the one or more connection links include an AC converter link for selectively electrically coupling the first AC bus and the second AC bus, the AC converter link including an AC/AC converter.

8. The AC electrical system of any preceding clause, wherein the AC/AC converter is a matrix converter.

9. The AC electrical system of any preceding clause, wherein the AC/AC converter is a cycloconverter.

10. The AC electrical system of any preceding clause, wherein: i) the first spool is a high pressure spool and the second spool is a low pressure spool; or ii) the first spool is the low pressure spool and the second spool is the high pressure spool.

11. The AC electrical system of any preceding clause, further comprising: one or more processors being configured to: cause electrical power generated by the second electric machine to be transferred across at least one of the one or more connection links from the second electrical channel to the first electrical channel and to the first electric machine based at least in part on a power share split for a power assist operation.

12. The AC electrical system of any preceding clause, further comprising: a DC bus system; a first AC/DC converter, the first AC/DC converter being a bidirectional AC/DC converter; and a second AC/DC converter, and wherein the first electrical channel electrically couples the first AC bus to the first AC/DC converter and the first AC/DC converter to the DC bus system, and wherein the second electrical channel electrically couples the second AC bus to the second AC/DC converter and the second AC/DC converter to the DC bus system, and wherein the second electrical channel has a load line that electrically couples a load AC/DC converter to the DC bus system and the load AC/DC converter to an electrical load, and wherein the second electrical channel has a secondary line that electrically connects the second AC bus with the load line at a point between the load AC/DC converter and the electrical load.

13. The AC electrical system of any preceding clause, wherein the one or more processors are further configured to: cause, based at least in part on the power share split for the power assist operation, electrical power generated by the second electric machine to be transferred along the secondary line, through the load AC/DC converter to the DC bus system, across the at least one of the one or more connection links from the second electrical channel to the first electrical channel, and along the first electrical channel to the first electric machine.

14. The AC electrical system of any preceding clause, wherein the first spool is an intermediate pressure spool and the second spool is one of a low pressure spool and a high pressure spool of the gas turbine engine.

15. A method, comprising: transferring electrical power generated by a second electric machine mechanically coupled with a second spool of a gas turbine engine to a first electric machine mechanically coupled with a first spool of the gas turbine engine over an AC electrical system of a vehicle, and wherein the transferring comprises at least one of: i) directing electrical power from the second electric machine along a second electrical channel to a second AC bus positioned along the second electrical channel, through a second AC/DC converter positioned along the second electrical channel, across one or more connection links at a DC level to a first electrical channel, through a first AC/DC converter to a first AC bus, and onward to the first electric machine; and ii) directing electrical power at an AC level from the second AC bus through an AC/AC converter positioned along an AC converter link electrically coupling the first AC bus and the second AC bus and onward to the first AC bus and to the first electric machine.

16. The method of any preceding clause, wherein the one or more connection links include a converter link, wherein the transferring comprises directing electrical power across the converter link at the DC level from the second AC/DC converter to the first AC/DC converter.

17. The method of any preceding clause, wherein the AC electrical system has a DC bus system that includes a first DC bus positioned along the first electrical channel and a second DC bus positioned along the second electrical channel, and wherein the one or more connection links include a DC bus link, and wherein the transferring comprises directing electrical power at the DC level across the DC bus link from the second DC bus to the first DC bus and then to the first AC/DC converter.

18. The method of any preceding clause, wherein the AC electrical system has a DC bus system that includes a single DC bus connected to the first electrical channel and the second electrical channel, and wherein the one or more connection links include the single DC bus, and wherein the transferring comprises directing electrical power at the DC level across the single DC bus.

19. The method of any preceding clause, wherein the transferring further comprises directing electrical power at the AC level from the second AC bus through the AC/AC converter positioned along the AC converter link electrically coupling the first AC bus and the second AC bus and onward to the first AC bus and to the first electric machine.

20. The method of any preceding clause, wherein the AC/AC converter is one of a matrix converter and a cyclo-converter.

21. The method of any preceding clause, wherein the second electrical channel has a load line that electrically couples a load AC/DC converter to a DC bus system and the load AC/DC converter to an electrical load, and wherein the second electrical channel has a secondary line that electrically connects the second AC bus with the load line at a point between the load AC/DC converter and the electrical load, and wherein the transferring further comprises directing electrical power along the secondary line, through the load AC/DC converter to the DC bus system, across the at least one of the one or more connection links from the second electrical channel to the first electrical channel, and along the first electrical channel to the first electric machine.

22. A method of transferring electrical power through an AC electrical system of a vehicle, the method comprising: generating, by a first electric machine mechanically coupled with a first spool of a gas turbine engine, electrical power; generating, by a second electric machine mechanically coupled with a second spool of the gas turbine engine, electrical power; in response to a detected generation failure associated with the second electric machine, transferring electrical power generated by the first electric machine across one or more connection links from a first electrical channel associated with the first electric machine to a second electrical channel associated with the second electric machine; and when a target condition is met, electrically coupling a first AC bus of the first electrical channel and a second AC bus of the second electrical channel with an AC bus link to transfer electrical power at an AC level from the first AC bus to the second AC bus and onward to one or more electrical loads associated with the second electrical channel.

23. The method of any preceding clause, wherein the one or more connection links include a converter link, wherein the transferring comprises directing electrical power across the converter link at a DC level from a first AC/DC converter of the first electrical channel to a second AC/DC converter of the second electrical channel.

24. The method of any preceding clause, wherein the AC electrical system has a DC bus system that includes a first DC bus positioned along the first electrical channel and a second DC bus positioned along the second electrical channel, and wherein the one or more connection links include a DC bus link, and wherein the transferring comprises directing electrical power at a DC level across the DC bus link from the first DC bus to the second DC bus and then to one or more AC/DC converters of the second electrical channel.

25. The method of any preceding clause, wherein the AC electrical system has a DC bus system that includes a single DC bus connected to the first electrical channel and the second electrical channel, and wherein the one or more connection links include the single DC bus, and wherein the transferring comprises directing electrical power at a DC level across the single DC bus and then to one or more AC/DC converters of the second electrical channel.

26. The method of any preceding clause, wherein the one or more connection links include an AC converter link having an AC/AC converter, and wherein the transferring comprises directing electrical power at an AC level from the first AC bus of the first electrical channel across the AC converter link and through the AC/AC converter to the second AC bus of the second electrical channel.

27. The method of any preceding clause, wherein the AC/AC converter is one of a matrix converter and a cyclo-converter.

28. The method of any preceding clause, wherein the target condition is met when electrical power has been transferred across the one or more connection links for a predetermined time.

29. The method of any preceding clause, wherein the target condition is met when a voltage level of the first AC bus and a voltage level of the second AC bus are within a predetermined range of one another.

30. The method of any preceding clause, wherein the target condition is met when a frequency of the first AC bus and a frequency of the second AC bus are within a predetermined range of one another.

31. A non-transitory computer readable medium comprising computer-executable instructions, which, when executed by one or more processors of a computing system for a vehicle, cause the one or more processors to: cause electrical power generated by a second electric machine mechanically coupled with a second spool of a gas turbine engine to be transferred to a second AC bus electrically coupled with the second electric machine; cause the electrical power transferred to the second AC bus to be transferred to one or more power converters to convert the electrical power; and cause the electrical power converted by the one or more power converters to be transferred to a first AC bus electrically coupled with a first electric machine mechanically coupled with a first spool of the gas turbine engine.

32. A method, comprising: transferring electrical power generated by a second electric machine mechanically coupled with a second spool of a gas turbine engine to a first electric machine mechanically coupled with a first spool of the gas turbine engine over an AC electrical system of a vehicle, and wherein the transferring comprises at least one of: i) directing electrical power from the second electric machine along a second electrical channel to a second AC bus positioned along the second electrical channel, through a second AC/DC converter positioned along the second electrical channel, across one or more connection links at a DC level to a first electrical channel, through a first AC/DC converter to a first AC bus; and ii) directing electrical power at an AC level from the second AC bus through an AC/AC converter positioned along an AC converter link electrically coupling the first AC bus and the second AC bus and onward to the first AC bus.

33. A non-transitory computer readable medium comprising computer-executable instructions, which, when executed by one or more processors of a computing system for a vehicle, cause the one or more processors to: cause transfer of electrical power generated by a second electric machine mechanically coupled with a second spool of a gas turbine engine to a first electric machine mechanically coupled with a first spool of the gas turbine engine over an AC electrical system of the vehicle, and wherein, in causing transfer of electrical power generated by the second electric machine to the first electric machine, the one or more processors cause at least one of: i) electrical power to be directed from the second electric machine along a second electrical channel to a second AC bus positioned along the second electrical channel, through a second AC/DC converter positioned along the second electrical channel, across one or more connection links at a DC level to a first electrical channel, through a first AC/DC converter to a first AC bus, and onward to the first electric machine; and ii) electrical power to be directed at an AC level from the second AC bus through an AC/AC converter positioned along an AC converter link electrically coupling the first AC bus and the second AC bus and onward to the first AC bus and to the first electric machine.

34. A non-transitory computer readable medium comprising computer-executable instructions, which, when executed by one or more processors of a computing system for a vehicle, cause the one or more processors to: cause a first electric machine mechanically coupled with a first spool of a gas turbine engine to generate electrical power; cause a second electric machine mechanically coupled with a second spool of the gas turbine engine to generate electrical power; in response to a detected generation failure associated with the second electric machine, cause electrical power generated by the first electric machine to be transferred across one or more connection links from a first electrical channel associated with the first electric machine to a second electrical channel associated with the second electric machine; and when a target condition is met, cause a first AC bus of the first electrical channel to be directly electrically coupled with a second AC bus of the second electrical channel so that electrical power is transferred at an AC level from the first AC bus to the second AC bus and onward to one or more electrical loads associated with the second electrical channel.

35. An AC electrical system for a vehicle, comprising: a first electric machine mechanically coupled with a first spool of a gas turbine engine; a second electric machine mechanically coupled with a second spool of the gas turbine engine; a first AC bus; a second AC bus; a first electrical channel electrically coupling the first electric machine to the first AC bus; a second electrical channel electrically coupling the second electric machine to the second AC bus; one or more connection links selectively electrically coupling the first electrical channel and the second electrical channel; one or more power converters operable to convert electrical power; and one or more processors configured to: cause the first electric machine to generate electrical power; cause the second electric machine to generate electrical power; in response to a detected generation failure associated with the second electric machine, cause electrical power generated by the first electric machine to be converted by the one or more power converters and transferred across the one or more connection links from the first electrical channel associated with the first electric machine to the second electrical channel associated with the second electric machine; and when a target condition is met, cause the first AC bus of the first electrical channel to be directly electrically coupled with the second AC bus of the second electrical channel so that electrical power is transferred at an AC level from the first AC bus to the second AC bus.

We claim:

1. An alternating current (AC) electrical system for a vehicle, comprising:
    a first electric machine mechanically coupled with a first spool of a gas turbine engine;
    a second electric machine mechanically coupled with a second spool of the gas turbine engine;
    a first AC bus;
    a second AC bus;
    a direct current (DC) bus system;
    a first AC/DC converter, the first AC/DC converter being a bidirectional AC/DC converter;
    a second AC/DC converter;
    a first electrical channel electrically coupling the first electric machine to the first AC bus, the first AC bus to the first AC/DC converter, and the first AC/DC converter to the DC bus system;
    a second electrical channel electrically coupling the second electric machine to the second AC bus, the second AC bus to the second AC/DC converter, and the second AC/DC converter to the DC bus system, and wherein the second electrical channel further comprises a load line that electrically couples a load AC/DC converter to the DC bus system and the load AC/DC converter to an electrical load, and wherein the second electrical channel has a secondary line that electrically connects the second AC bus with the load line at a point between the load AC/DC converter and the electrical load;
    one or more connection links selectively electrically coupling the first AC bus and the second AC bus;
    and one or more power converters operable to convert electrical power transferred between the first AC bus and the second AC bus across the one or more connection links so that electrical power generated by the second electric machine is transferable from the second AC bus to the first AC bus or so that electrical power generated by the first electric machine is transferable from the first AC bus to the second AC bus.

2. The AC electrical system of claim 1, wherein the DC bus system includes a first DC bus positioned along the first electrical channel and a second DC bus positioned along the second electrical channel, and wherein the one or more connection links include a DC bus link for selectively electrically coupling the first DC bus and the second DC bus of the DC bus system.

3. The AC electrical system of claim 1, wherein the DC bus system includes a single DC bus, and wherein the one or more connection links include the single DC bus for selectively electrically coupling the first electrical channel and the second electrical channel.

4. The AC electrical system of claim 1, wherein the DC bus system is one of a voltage DC bus and a current DC bus.

5. The AC electrical system of claim 1,
    wherein the one or more connection links include a converter link for selectively electrically coupling the first AC/DC converter and the second AC/DC converter.

6. The AC electrical system of claim 1, wherein the one or more connection links include an AC converter link for selectively electrically coupling the first AC bus and the second AC bus, the AC converter link including an AC/AC converter.

7. The AC electrical system of claim 6, wherein the AC/AC converter is a matrix converter.

8. The AC electrical system of claim 6, wherein the AC/AC converter is a cycloconverter.

9. The AC electrical system of claim 1, wherein:
    i) the first spool is a high pressure spool and the second spool is a low pressure spool; or
    ii) the first spool is the low pressure spool and the second spool is the high pressure spool.

10. The AC electrical system of claim 1, further comprising:
    one or more processors being configured to:
        cause electrical power generated by the second electric machine to be transferred across at least one of the one or more connection links from the second electrical channel to the first electrical channel and to the first electric machine based at least in part on a power share split for a power assist operation.

11. The AC electrical system of claim 1, wherein the one or more processors are further configured to:
cause, based at least in part on the power share split for the power assist operation, electrical power generated by the second electric machine to be transferred along the secondary line, through the load AC/DC converter to the DC bus system, across the at least one of the one or more connection links from the second electrical channel to the first electrical channel, and along the first electrical channel to the first electric machine.

12. The AC electrical system of claim 1, wherein the first spool is an intermediate pressure spool and the second spool is one of a low pressure spool and a high pressure spool of the gas turbine engine.

\* \* \* \* \*